US012258004B2

(12) United States Patent
Funke et al.

(10) Patent No.: US 12,258,004 B2
(45) Date of Patent: Mar. 25, 2025

(54) INDEPENDENT CONTROL OF VEHICLE WHEELS

(71) Applicant: Zoox, Inc., Foster City, CA (US)

(72) Inventors: Joseph Funke, Redwood City, CA (US); Johannes Edren, Belmont, CA (US); Ali Javidan, Sunnyvale, CA (US); Jacob Lee Askeland, San Jose, CA (US); Vasumathi Raman, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 97 days.

(21) Appl. No.: 17/468,499

(22) Filed: Sep. 7, 2021

(65) Prior Publication Data

US 2021/0402984 A1  Dec. 30, 2021

Related U.S. Application Data

(63) Continuation of application No. 15/787,474, filed on Oct. 18, 2017, now Pat. No. 11,136,021.

(51) Int. Cl.
*B60W 30/04* (2006.01)
*B60T 8/24* (2006.01)
(Continued)

(52) U.S. Cl.
CPC ............ *B60W 30/04* (2013.01); *B60T 8/243* (2013.01); *B60W 10/184* (2013.01);
(Continued)

(58) Field of Classification Search
CPC .................................................. B60W 30/04
See application file for complete search history.

(56) References Cited

U.S. PATENT DOCUMENTS

| 3,899,028 A | 8/1975 | Morris et al. |
| 3,994,352 A | 11/1976 | Siorek |

(Continued)

FOREIGN PATENT DOCUMENTS

| DE | 4410428 A1 | 9/1994 |
| EP | 2213549 A1 | 8/2010 |

(Continued)

OTHER PUBLICATIONS

Google Machine Translation of Japanese Patent No. JP4635667B2 that published in 2006 (hereinafter "the 667 patent"). (Year: 2006).*

(Continued)

*Primary Examiner* — Jean Paul Cass
(74) *Attorney, Agent, or Firm* — Lee & Hayes, P.C.

(57) ABSTRACT

An over actuated system capable of controlling wheel parameters, such as speed (e.g., by torque and braking), steering angles, caster angles, camber angles, and toe angles, of wheels in an associated vehicle. The system may determine the associated vehicle is in a rollover state and adjust wheel parameters to prevent vehicle rollover. Additionally, the system may determine a driving state and dynamically adjust wheel parameters to optimize driving, including, for example, cornering and parking. Such a system may also dynamically detect wheel misalignment and provide alignment and/or corrective driving solutions. Further, by utilizing degenerate solutions for driving, the system may also estimate tire-surface parameterization data for various road surfaces and make such estimates available for other vehicles via a network.

8 Claims, 16 Drawing Sheets

(51) Int. Cl.
    *B60W 10/184*     (2012.01)
    *B60W 10/20*     (2006.01)
    *B60W 30/18*     (2012.01)
    *B62D 7/06*     (2006.01)
    *B62D 17/00*     (2006.01)

(52) U.S. Cl.
    CPC ...... *B60W 10/20* (2013.01); *B60W 30/18145* (2013.01); *B62D 7/06* (2013.01); *B62D 17/00* (2013.01); *B60W 2520/18* (2013.01)

(56) References Cited

U.S. PATENT DOCUMENTS

| | | | |
|---|---|---|---|
| 4,371,191 | A | 2/1983 | Goldberg et al. |
| 4,715,466 | A | 12/1987 | Ishii et al. |
| 4,716,982 | A | 1/1988 | Shii et al. |
| 4,720,663 | A | 1/1988 | Welch et al. |
| 4,955,443 | A | 9/1990 | Bausch |
| 5,026,081 | A | 6/1991 | Bauer |
| 5,032,821 | A | 7/1991 | Domanico et al. |
| 5,226,675 | A | 7/1993 | Noah et al. |
| 5,383,680 | A | 1/1995 | Bock et al. |
| 5,563,575 | A | 10/1996 | Yamamura et al. |
| 5,610,575 | A | 3/1997 | Gioutsos |
| 5,671,982 | A | 9/1997 | Wanke |
| 5,694,321 | A | 12/1997 | Eckert et al. |
| 5,710,704 | A | 1/1998 | Graber |
| 5,762,157 | A | 6/1998 | Uehara |
| 5,808,197 | A | 9/1998 | Dao |
| 5,890,084 | A | 3/1999 | Halasz et al. |
| 5,939,626 | A | 8/1999 | Tominaga et al. |
| 6,098,296 | A | 8/2000 | Perisho, Jr. et al. |
| 6,225,894 | B1 * | 5/2001 | Kyrtsos ............... B60T 8/243 340/440 |
| 6,275,753 | B1 | 8/2001 | Kyrtsos |
| 6,438,464 | B1 | 8/2002 | Woywod et al. |
| 6,496,758 | B2 | 12/2002 | Rhode et al. |
| 6,529,811 | B2 | 3/2003 | Watson et al. |
| 6,546,323 | B2 | 4/2003 | Deguchi et al. |
| 6,625,529 | B2 | 9/2003 | Obata et al. |
| 6,668,225 | B2 | 12/2003 | Oh et al. |
| 6,671,595 | B2 * | 12/2003 | Lu ............... B60T 8/17551 180/197 |
| 6,923,280 | B2 | 8/2005 | Goertzen et al. |
| 6,938,716 | B1 | 9/2005 | Eull |
| 7,057,503 | B2 | 6/2006 | Watson |
| 7,083,195 | B2 | 8/2006 | Goertzen et al. |
| 7,162,340 | B2 | 1/2007 | Schubert et al. |
| 7,191,047 | B2 * | 3/2007 | Chen ............... B60T 8/17555 701/72 |
| 7,315,777 | B2 | 1/2008 | Ono |
| 7,373,236 | B2 * | 5/2008 | Matsuno ............... B60T 8/1755 701/91 |
| 8,594,888 | B2 | 11/2013 | Fujita et al. |
| 8,607,914 | B2 | 12/2013 | Lee et al. |
| 9,327,765 | B2 | 5/2016 | Takeda |
| 9,860,839 | B2 | 1/2018 | Kates |
| 9,950,702 | B2 | 4/2018 | Michaelsen et al. |
| 9,986,484 | B2 | 5/2018 | Twitchell, Jr. |
| 10,035,540 | B2 | 7/2018 | Yang et al. |
| 10,112,536 | B2 | 10/2018 | Jones et al. |
| 10,759,416 | B1 * | 9/2020 | Funke ............... B60T 8/17554 |
| 11,136,021 | B1 * | 10/2021 | Funke ............... B62D 7/159 |
| 2001/0032748 | A1 | 10/2001 | Demerly |
| 2002/0019685 | A1 | 2/2002 | Ries-Mueller |
| 2003/0236604 | A1 | 12/2003 | Lu et al. |
| 2004/0186647 | A1 | 9/2004 | Ono |
| 2005/0057045 | A1 | 3/2005 | Thomas et al. |
| 2005/0114072 | A1 | 5/2005 | Choi |
| 2005/0279563 | A1 | 12/2005 | Peterson |
| 2006/0217867 | A1 | 9/2006 | Ono et al. |
| 2007/0017726 | A1 | 1/2007 | Takemura |
| 2007/0052377 | A1 | 3/2007 | Fuwa |
| 2007/0067085 | A1 * | 3/2007 | Lu ............... B60W 40/114 340/440 |
| 2008/0017436 | A1 | 1/2008 | Dower |
| 2008/0119984 | A1 | 5/2008 | Hrovat et al. |
| 2008/0147275 | A1 | 6/2008 | Okazaki et al. |
| 2008/0201037 | A1 | 8/2008 | Suyama et al. |
| 2008/0243327 | A1 | 10/2008 | Bujak et al. |
| 2008/0243334 | A1 | 10/2008 | Bujak et al. |
| 2008/0243335 | A1 | 10/2008 | Rao et al. |
| 2008/0281487 | A1 | 11/2008 | Milot |
| 2009/0018725 | A1 | 1/2009 | Ono et al. |
| 2009/0063002 | A1 | 3/2009 | Ono et al. |
| 2011/0035113 | A1 | 2/2011 | Yanagi |
| 2011/0166744 | A1 * | 7/2011 | Lu ............... B60T 8/1755 701/1 |
| 2011/0178671 | A1 | 7/2011 | Bae et al. |
| 2012/0016544 | A1 | 1/2012 | Pariseau et al. |
| 2014/0309849 | A1 | 10/2014 | Ricci |
| 2015/0210268 | A1 | 7/2015 | Yang et al. |
| 2015/0232124 | A1 | 8/2015 | Takeda |
| 2017/0120753 | A1 | 5/2017 | Kentley |
| 2017/0210380 | A1 | 7/2017 | Hegemann |
| 2018/0057050 | A1 | 3/2018 | Takenaka et al. |
| 2018/0222528 | A1 | 8/2018 | Jagenstedt et al. |
| 2022/0314965 | A1 * | 10/2022 | Abughaida ............... B60W 40/13 |

FOREIGN PATENT DOCUMENTS

| | | | |
|---|---|---|---|
| JP | H09039824 | A | 2/1997 |
| JP | 2010100133 | | * 10/2008 |
| JP | 2010100133 | A | 5/2010 |
| JP | 4635667 | B2 * | 2/2011 |
| WO | WO2016148112 | A1 | 9/2016 |

OTHER PUBLICATIONS

Google Machine Translation of Japanese Patent Pub. No. JP 2010100133A to Tatsuya Fukushima that was filed in 2008 and published in 2010 (Year: 2008).*
NPL, Di Cairano, Stefano, et al., Vehicle Yaw Stability Control by Coordinated Active Front Steering and Differential Braking in the Tire Sideslip Angles Domain, IEEE Transactions on Control Systems Technology, vol. 21, No. 4, Jul. 2013 (https://ieeexplore.ieee.org/stamp/stamp.jsp?tp=&arnumber=6217300&tag=1)(herei.*
Gao, et al. "Genetic Algorithm-Based Varying Parameter Linear Quadratic Regulator Control for Four-Wheel Independent Steering Vehicle", Advances in Mechanical Engineering, 2015, vol. 7 (II), pp. 1-14.
Non Final Office Action dtd Mar. 19, 2019 for U.S. Appl. No. 15/787,380 "Independent Control of Vehicle Wheels" Funke, 6 pages.
Final Office Action dated Sep. 24, 2020 for U.S. Appl. No. 15/787,474, "Independent Control of Vehicle Wheels", Funke, 64 pages.
Office Action for U.S. Appl. No. 15/787,474, mailed on Jan. 21, 2021, Funke, "Independent Control of Vehicle Wheels", 67 pages.
Office Action for U.S. Appl. No. 15/787,474, mailed on Oct. 7, 2019, Funke, "Independent Control of Vehicle Wheels", 44 pages.
Non Final Office Action dated Nov. 6, 2019 for U.S. Appl. No. 15/787,334 "Independent Control of Vehicle Wheels" Funke, 16 pages.
Office Action for U.S. Appl. No. 15/787,418, mailed on Dec. 2, 2019, Funke, "Independent Control of Vehicle Wheels", 34 pages.
Non Final Office Action dated Feb. 18, 2020 for U.S. Appl. No. 15/787,474 "Independent Control of Vehicle Wheels" Funke, 59 pages.
Office Action for U.S. Appl. No. 15/787,334, mailed on May 2, 2019, Funke, "Independent Control of Vehicle Wheels", 12 pages.
Office Action for U.S. Appl. No. 15/787,474, mailed on May 3, 2019, Funke, "Independent Control of Vehicle Wheels", 34 pages.
Office Action for U.S. Appl. No. 15/787,418, mailed on Aug. 13, 2019, Funke, "Independent Control of Vehicle Wheels ", 35 pages.
Prem, et al., "A New Steerable Wheel System For Road Transport Applications", 2008, pp. 305-317.

* cited by examiner

INDEPENDENT CONTROL OF VEHICLE WHEELS

CROSS-REFERENCE TO RELATED APPLICATION

This application is a continuation of and claims priority to U.S. application Ser. No. 15/787,474, filed on Oct. 18, 2017, and entitled "INDEPENDENT CONTROL OF VEHICLE WHEELS," the entirety of which is incorporated herein by reference.

BACKGROUND

Vehicles often include a steering system and a braking system for controlling maneuvering of the vehicle. A steering system may be used to maneuver the vehicle along roads, causing the vehicle to travel through curves and provide general maneuverability, and a braking system may be used to slow or stop the vehicle. Used in combination with a powertrain, the steering and braking systems of the vehicle may be used to control the vehicle to maneuver between locations, avoid objects, and park the vehicle once the vehicle has arrived at a destination. However, situations may arise for which the steering and braking systems may be incapable of providing sufficient operational flexibility and/or safety. Thus, systems that provide enhanced control and/or maneuverability for a vehicle may be desired.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

FIG. 9A is a schematic overhead view of an example vehicle having front wheels with toe-in.

DETAILED DESCRIPTION

Figure 1:
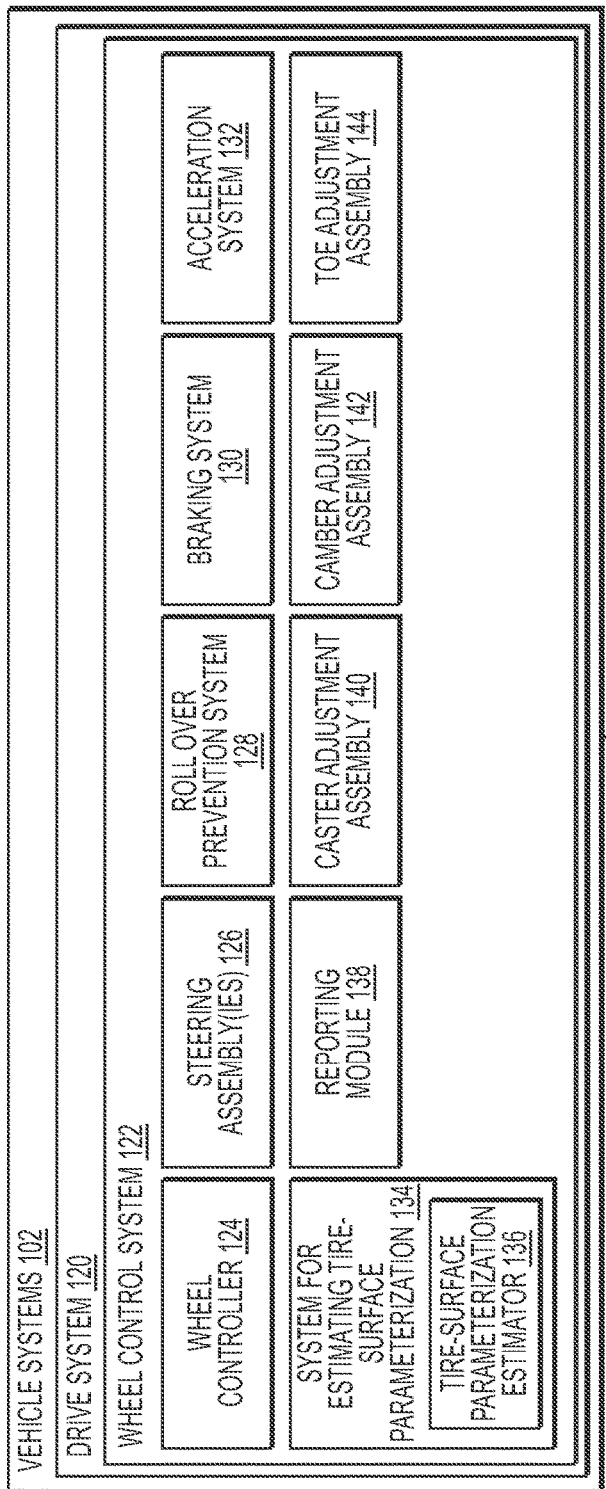
FIG. 1 is a perspective view of an example vehicle including example vehicle systems shown in block diagram form.
Figure 1:
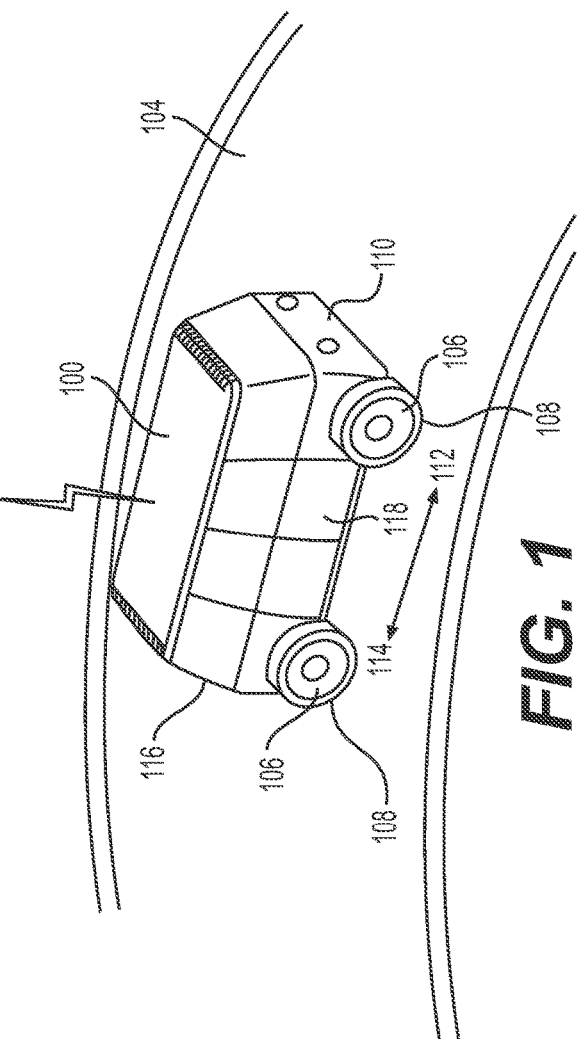

Vehicles may include a steering system and a braking system for controlling maneuvering of the vehicle. However, situations may arise for which the steering and braking systems may be incapable of providing sufficient operational flexibility and/or safety.

This disclosure is generally directed to independent control of wheels and/or tires of a vehicle, which may provide enhanced safety, improved control, improved maneuverability, and/or acquisition of information relevant to operation of the vehicle or other vehicles. Some examples may facilitate preventing roll over of the vehicle, provide greater maneuverability or control when traveling through curves, provide ease of parking, provide greater directional stability, provide improved cornering ability, facilitate real-time vehicle alignment, and/or facilitate estimation of tire-surface parameterization data associated with the surface on which the vehicle is traveling. Tire-surface parameterization data may include, for example, friction-related data (e.g., static and/or dynamic coefficients of friction, including linear and non-linear tire behavior), tire cornering stiffness, side slip force, tire slip angles, or the like.

This disclosure is generally directed to a wheel control system configured to facilitate control of a vehicle having a longitudinal axis extending along a line between a first end of the vehicle and a second end of the vehicle opposite the first end of the vehicle. In some examples, the longitudinal axis of the vehicle may be aligned with, or contained in a plane, passing through the centerline of the vehicle. The wheel control system may include a first steering assembly configured to be coupled proximate to the first end of the vehicle and control wheel parameters of first wheels coupled proximate to the first end of the vehicle. The wheel control system may also include a wheel controller configured to control, based at least in part on a signal indicative of a rollover event, one or more parameters associated with the first wheels to prevent the vehicle from rolling over. The one or more parameters of the first steering assembly may include a steering angle and one or more of a caster angle, a camber angle, a toe angle, or a wheel speed.

The rollover event may include a lateral force acting on the vehicle in a first direction transverse to the longitudinal axis of the vehicle. In some examples, the wheel controller may be configured to determine, based at least in part on the signal indicative of a rollover event, that the lateral force exceeds a threshold force, and adjust wheel parameters of one or more of the first wheels or second wheels coupled proximate to the second end of the vehicle to reduce the lateral force to less than the threshold force. Wheel parameters of the second wheels may include one or more of a steering angle, a camber angle, a caster angle, or a toe angle.

The lateral force may result from a number of conditions. For example, the lateral force may result from lateral acceleration of the vehicle during cornering. In some examples, the wheel controller may be configured to control the first steering assembly to reduce the lateral acceleration of the vehicle to reduce the lateral force, so that the lateral force is less than the threshold force. The lateral force may result from other conditions, such as, for example, the wind.

The lateral force may result from a collision force. In some examples, the wheel controller may be configured to control the first steering assembly and a second steering assembly configured to be coupled proximate to the second end of the vehicle and control wheel parameters of second wheels coupled proximate to the second end of the vehicle to mitigate effects of the lateral force resulting from the collision force to prevent rollover of the vehicle.

In some examples, the wheel controller may be configured to cause the first steering assembly to pivot the first wheels at first steering angles relative to the longitudinal axis of the vehicle, and the second steering assembly to pivot the second wheels at second steering angles relative to the longitudinal axis of the vehicle. In some examples, the first and second steering angles may have the same sign (e.g., the first and second steering assemblies may pivot the respective wheels in the same direction relative to the longitudinal axis of the vehicle (i.e., both to the right, or both to the left)). In some examples, the first and second steering angles may have opposite signs (e.g., the first and second steering assemblies may pivot the respective wheels in opposite directions relative to the longitudinal axis of the vehicle (e.g., the first wheels pivot to the right, and the second wheels pivot to the left)).

In some examples, the wheel control system may include a braking system including brakes configured be coupled to one or more of at least one of the first wheels or at least one of the second wheels and a braking controller configured to control operation of the brakes. The braking controller may be configured to slow rotation of one or more of at least one of the first wheels or at least one of the second wheels of the vehicle based at least in part on the signal indicative of a rollover event. In some examples, the wheel control system may include an acceleration system including, for example, a motor configured to be coupled to one or more of at least one of the first wheels or at least one of the second wheels. The acceleration system may also include a motor controller configured to cause the motor to supply torque to one or more of at least one of the first wheels or at least one of the second wheels based at least in part on the signal indicative of a rollover event.

In some examples, the wheel control system may include a first steering assembly configured to be coupled proximate to the first end of the vehicle and control steering angles of first wheels coupled proximate to the first end of the vehicle. In some examples, the first steering assembly may be configured to independently control the steering angles of each of the first wheels of the vehicle. The wheel control system may also include a second steering assembly configured to be coupled proximate to the second end of the vehicle and control steering angles of second wheels coupled proximate to the second end of the vehicle. In some examples, the second steering assembly may be configured to independently control the steering angles of each of the second wheels of the vehicle. The wheel control system may further include a wheel controller configured to receive one or more signals indicative of a lateral force acting on the vehicle in a first direction transverse to the longitudinal axis of the vehicle. Such signal(s) may be generated via one or more sensors coupled to the vehicle and configured to generate such signals. In some examples, the wheel controller may be configured to determine, based at least in part on the one or more signals, when the lateral force exceeds a threshold force, for example, sufficient to cause the vehicle to roll over in the first direction. The wheel controller, in some examples, may be configured to control, when the lateral force exceeds the threshold force, one or more of the first steering assembly or the second steering assembly to reduce the lateral force to less than the threshold force, for example, to prevent the vehicle from rolling over.

In some examples, the wheel controller may be configured to determine, based at least in part on the one or more signals, when the lateral force exceeds a roll coefficient multiplied by a roll force sufficient to cause the vehicle to roll over in the first direction. The wheel controller, in some examples, may be configured to control, when the lateral force exceeds the roll coefficient multiplied by the roll force, one or more of the first steering assembly or the second steering assembly to reduce the lateral force to less than the roll coefficient multiplied by the roll force and prevent the vehicle from rolling over. In some examples, the roll coefficient may account for one or more safety factors. Other factors may be reflected in the roll coefficient. In some examples, the roll force may be predetermined, for example, based on characteristics of the vehicle (e.g., physical characteristics such as the weight and/or roll center of the vehicle), or the roll force may be determined in real-time while the vehicle maneuvers.

In some examples, when the vehicle is traveling in a first forward travel direction, such that the first end of the vehicle is the front end of the vehicle, the wheel controller may be configured to cause the first steering assembly to pivot the first wheels coupled proximate to the front end of the vehicle at respective first steering angles relative to the first forward travel direction of the vehicle. In some examples, the first steering angles may range from about one degree to about 90 degrees from the first forward travel direction toward the first direction transverse to the longitudinal axis of vehicle. The wheel controller may also be configured to cause the second steering assembly to pivot the second wheels at second steering angles relative to the first forward travel direction of the vehicle. In some examples, the second steering angles may range from about one degree to about 90 degrees from the first forward travel direction toward the first direction transverse to the longitudinal axis of vehicle. For example, if the lateral force acting on the vehicle is toward the right side of the vehicle as viewed from the passenger compartment and facing in the first forward travel direction, the first steering angles may result in the first wheels pivoting toward the right, such that the front end of the vehicle will steer toward the right, and the second steering angles may result in the second wheels pivoting toward the right, such that the rear end of the vehicle will steer toward the right.

In some examples, when the vehicle is traveling in the first forward travel direction, such that the first end of the vehicle is the front end of the vehicle, the wheel controller may be configured to cause the first steering assembly to pivot the first wheels at first steering angles relative to the first forward travel direction of the vehicle. The first steering angles may range from about one degree to about 90 degrees from the first forward travel direction and in a direction opposite the first direction transverse to the longitudinal axis of vehicle. The wheel controller may also be configured to cause the second steering assembly to pivot the second wheels at second steering angles relative to the first forward travel direction of the vehicle. The second steering angles may range from about one degree to about 90 degrees from the first forward travel direction toward the first direction transverse to the longitudinal axis of vehicle. For example, if the lateral force acting on the vehicle is toward the right side of the vehicle as viewed from the passenger compartment and facing in the first forward travel direction, the first steering angles may result in the first wheels pivoting toward the left, such that the front end of the vehicle will steer toward the left, and the second steering angles may result in the second wheels pivoting toward the right, such that the rear end of the vehicle will steer toward the right.

This disclosure is also generally directed to a rollover prevention system including a wheel control system as outlined herein. In some examples, the rollover prevention system may include a braking system including respective brakes configured to be coupled to the first wheels of the vehicle. The braking system may also include a braking controller configured to control operation of the brakes. In some examples, the braking controller may be configured to cause rotation of at least one of the first wheels to slow in response to receipt of one or more signals indicative of the lateral force exceeding the roll coefficient multiplied by the roll force. In some examples, the braking system may be configured to independently control the brakes coupled to each of the first wheels of the vehicle. Some examples of the rollover prevention system may include an acceleration system including a motor configured to be coupled to the second wheels of the vehicle and a motor controller configured to cause the motor to supply torque to one or more of the second wheels of the vehicle in response to receipt of the one or more signals indicative the lateral force exceeding the threshold force, or, for example, the roll coefficient multiplied by the roll force. In some examples, the acceleration system may be configured to independently control the acceleration of each of the second wheels of the vehicle. In some examples, the wheel control system, the braking system, and/or the acceleration system may be used in combination to prevent the vehicle from rolling over (or reduce the likelihood of the vehicle rolling over).

This disclosure is also generally directed to a wheel control system configured to facilitate control of a vehicle. In some examples, the wheel control system may include a first steering assembly configured to be coupled proximate to the first end of the vehicle and control one or more parameters of first wheels coupled proximate to the first end of the vehicle. The wheel control system may also include a second steering assembly configured to be coupled proximate to the second end of the vehicle and control one or more parameters of second wheels coupled proximate to the second end of the vehicle. The wheel control system may further include a wheel controller configured to receive a signal indicative of a vehicle maneuver, and control operation of the first steering assembly and the second steering assembly to control the one or more parameters of the first wheels and the one or more parameters of the second wheels, respectively, based at least in part on the signal indicative of the vehicle maneuver. In some examples, the one or more parameters of the first and second steering assemblies may include a steering angle and one or more of a caster angle, a camber angle, a toe angle, or a wheel speed.

In some examples, the signal indicative of the vehicle maneuver corresponds to the vehicle following a trajectory having a curvature greater than zero and a speed greater than zero. The signal indicative of a vehicle maneuver may include a signal indicative of the speed of the vehicle, and the wheel controller may be configured to control operation of the first steering assembly and second steering assembly according to a first mode based at least in part on the signal indicative of the speed of the vehicle and transition to operation according to a second mode when the signal indicative of the speed of the vehicle indicates the speed of the vehicle is increasing. In some examples, controlling the first steering assembly and the second steering assembly according to the first mode may include causing the first steering assembly to adjust one or more of the castor angle, camber angle, or toe angle. In some examples, controlling the first steering assembly and the second steering assembly according to the first mode may include causing the first steering assembly to pivot the first wheels at first steering angles in a first direction relative to the longitudinal axis of the vehicle, and causing the second steering assembly to pivot the second wheels at second steering angles in a second direction relative to the longitudinal axis of the vehicle, the first and second steering angles having opposite signs. According to some examples, controlling the first steering assembly and the second steering assembly according to the second mode may include causing the first steering assembly to pivot the first wheels at first steering angles in a first direction relative to the longitudinal axis of the vehicle, and causing the second steering assembly to pivot the second wheels at second steering angles in a second direction relative to the longitudinal axis of the vehicle, the first and second steering angles having the same sign. Operating in the first mode may provide more maneuverability at relatively lower speeds, and operating in the second mode may provide greater cornering stability at relatively higher speeds. In some examples, the transition between the first mode and the second mode may be gradual and may be related to vehicle speed and/or other factors, such as, for example, steering angle and/or braking. In some examples, the transition between the first and second modes may depend on a threshold speed, below which the vehicle operates according to the first mode, and above which the vehicle operates according to the second mode. In some examples, the transition from the second mode to the first mode may occur as the vehicle speed is reduced, for example, in a manner similar to the transition from the first mode to the second mode. In some examples, there may not be a unique threshold, but angles may vary continuously with respect to speed.

According to some examples, the signal indicative of a vehicle maneuver may include a signal indicative of initiating parallel parking into a parking space. For example, when the vehicle approaches the parking space in a first travel direction, the wheel controller may be configured to control operation of the first steering assembly and the second steering assembly to cause the vehicle to park in the parking space (e.g., without the vehicle traveling in a second travel direction opposite the first travel direction). In some examples, the wheel controller may be configured to control operation of the first steering assembly to provide steering angles of the first wheels that direct the first wheels toward the parking space and into the parking space, and control operation of the second steering assembly to provide steering angles of the second wheels that direct the second wheels toward parking space and into the parking space. The wheel controller may be configured to thereafter control operation of the first steering assembly to provide steering angles of the first wheels that direct the first wheels in a direction at least one of along a longitudinal axis of the parking space or toward a distal longitudinal border of the parking space and into the parking space, while controlling operation of the second steering assembly to provide steering angles of the second wheels that direct the second wheels toward the distal longitudinal border of the parking space and into the parking space.

In some examples, the wheel controller may be configured to receive one or more signals indicative of the speed of the vehicle and/or one or more signals indicative of initiating one or more of a lane change of the vehicle or a change in trajectory of the vehicle. In such examples, the wheel controller may be configured to control operation of the first steering assembly and the second steering assembly to control the steering angles of the first wheels and the steering angles of the second wheels, respectively, based at least in part on the one or more signals indicative of the speed of the vehicle and/or the one or more signals indicative of initiating one or more of a lane change of the vehicle or a change in trajectory of the vehicle. For example, the wheel controller may be configured to control operation of the first steering assembly and second steering assembly according to a first mode when the one or more signals indicative of the speed of the vehicle indicate the speed of the vehicle is greater than or equal to a threshold speed, and according to a second mode when the one or more signals indicative of the speed of the vehicle indicate the speed of the vehicle is less than the threshold speed. For example, controlling the first steering assembly and the second steering assembly according to the first mode may include causing the first steering assembly to pivot the first wheels at first steering angles in a first direction relative to the longitudinal axis of the vehicle, and causing the second steering assembly to pivot the second wheels at second steering angles in the first direction relative to the longitudinal axis of the vehicle. For example, when maneuvering through a curve that bends to the right, the wheel controller may be configured to cause the first and second steering assemblies to turn the first wheels and the second wheels toward the right, so the both the front end and rear end of the vehicle move toward the right and through the curve. In some examples, although first wheels and the second wheels are turned in the same direction, the first steering angles may differ from the second steering angles. For example, the first steering angles may be 15 degrees to the right, and the second steering angles may be 10 degrees to the right. This may provide improved stability at higher speeds when maneuvering through a curve.

In some examples, controlling the first steering assembly and the second steering assembly according to the second mode may include causing the first steering assembly to pivot the first wheels at first steering angles in a first direction relative to the longitudinal axis of the vehicle, and causing the second steering assembly to pivot the second wheels at second steering angles in a second direction relative to the longitudinal axis of the vehicle, such that the first direction and the second direction are different from one another. For example, the wheel controller may cause the first steering assembly to turn the first wheels to the right and the second steering assembly to turn the second wheels to the left. This may provide more maneuverability at lower speeds, which may be desirable, for example, in a parking lot.

This disclosure is also generally directed to a wheel control system configured to facilitate control of a wheel. The wheel control system may include a steering assembly configured to be coupled proximate to a first end of a vehicle and control steering angles of the wheel, the wheel coupled proximate to the first end of the vehicle. The wheel controller may be configured to receive a signal indicative of a state of the vehicle, and cause the wheel controller to change one or more wheel parameters of the first wheels based at least in part on the signal indicative of the state of the vehicle. The signal indicative of a state of the vehicle may include one or more of a signal indicative of the direction of travel of the vehicle, a signal indicative of a speed of the vehicle, a signal indicative of a steering angle of the vehicle, or a signal indicative of an instability associated with the vehicle. The wheel controller is configured to control, based at least in part on the one or more signals indicative of the state of the vehicle, the one or more wheel parameters of the first wheels by controlling operation of one or more of a camber adjustment assembly configured to control a camber angle of the wheel, a caster adjustment assembly to configured to control a caster angle of the wheel, and a toe adjustment assembly configured to control a toe angle of the wheel.

For example, the signal indicative of the state of the vehicle may include a signal indicative that the vehicle is traveling in the forward travel direction. The one or more wheel parameters may include caster angles, and the wheel controller may be configured to control operation of a caster adjustment assembly to cause the wheel to have positive caster angle. In some examples, the signal indicative of the state of the vehicle may include a signal indicative that the vehicle is traveling in a forward travel direction, such that the first end of the vehicle is the front end of the vehicle. The one or more wheel parameters include camber angles, and the wheel controller may be configured to control operation of a camber adjustment assembly to cause the first wheels to change camber angles based at least in part on the signal indicative that the vehicle is travelling in the first forward travel direction.

Some examples of the wheel control system may include a caster adjustment assembly coupled (directly or indirectly) to one or more of the first steering assembly or the second steering assembly. The caster adjustment assembly may be configured to change caster angles of the first wheels and/or the second wheels. In some examples, the vehicle may be a bi-directional vehicle configured to travel between locations with either end of the vehicle being the leading or front end. The vehicle may include sensors and/or a system configured to generate one or more signals indicative of which end of the vehicle is the front or leading end. The wheel control system may include a wheel controller configured to receive one or more signals indicative of a direction of travel of the vehicle, and cause the caster adjustment assembly to change the caster angles of one of the first wheels or the second wheels based at least in part on the one or more signals indicative of the direction of travel of the vehicle. For example, when the vehicle is traveling in a first forward travel direction, such that the first end of the vehicle is the front end of the vehicle, the wheel controller may be configured to control operation of the caster adjustment assembly to cause the first wheels coupled proximate to the first end of the vehicle to have positive caster angles. This may improve the on-center steering stability of the vehicle. In some examples, the caster angles of the wheels of the rear or trailing end of the vehicle may be adjusted.

In some examples, the vehicle may be configured to travel in a first forward travel direction, such that the first end of the vehicle is the front end of the vehicle, and travel in a second forward travel direction, such that the second end of the vehicle is the front end of the vehicle. In such examples, the wheel controller may be configured to receive one or more signals indicative of the first forward travel direction and control operation of the caster adjustment assembly to cause one of the first wheels or the second wheels to have positive caster angles based at least in part on the one or more signals indicative of the first forward travel direction of the vehicle.

Some examples of the wheel control system may include a camber adjustment assembly coupled (directly or indirectly) to one or more of the first steering assembly or the second steering assembly. The camber adjustment assembly may be configured to change camber angles of one or more of the first wheels and/or one or more of the second wheels. For example, when the vehicle is traveling in a first forward travel direction, such that the first end of the vehicle is the front end of the vehicle, the wheel controller may be configured to control operation of the camber adjustment assembly to cause the first wheels to have negative camber angles (e.g., respective planes passing through the centers of the wheels and the outer diameters will intersect above the vehicle). In some examples, the wheel controller may be configured to receive one or more signals indicative of initiating turning of the vehicle, and control operation of the camber adjustment assembly to cause the one or more of the first wheels and/or one or more of the second wheels to increase amounts of respective negative camber angles based at least in part on the one or more signals indicative of initiating turning of the vehicle. Negative camber angles may improve by the cornering grip of the tires, thereby improving cornering ability of the vehicle.

Some examples of the wheel control system may include a toe adjustment assembly coupled (directly or indirectly) to one or more of the first steering assembly or the second steering assembly. The toe adjustment assembly may be configured to change a toe angle of one or more of the first wheels and/or one or more of second wheels. For example, the wheel control system may include a controller configured to receive one or more signals indicative of the speed of the vehicle, and receive one or more signals indicative of initiating a turn for the vehicle. Based on one or more of these signals, the wheel controller may be configured to control operation of the toe adjustment assembly to change the toe angle of one or more of the first wheels and/or one or more of the second wheels. For example, the wheel controller may be configured to control operation of the toe adjustment assembly to change the toe angle of both the first wheels and/or both the second wheels, such that an amount of toe-in (e.g., respective planes passing through the centers of the wheels and the outer diameters will intersect in front of the vehicle) of the first wheels and/or the amount of toe-in of the second wheels is reduced upon receipt of the one or more signals indicative of initiating a turn for the vehicle. For example, the toe adjustment assembly may change the toe angle of one or more of the first wheels and/or one or more of the second wheels to have toe-out. Toe-out may improve the responsiveness of the vehicle to steering inputs.

In some examples, the wheel controller may be configured to control operation of the toe adjustment assembly based at least in part on the one or more signals indicative of speed, and the wheel controller may be configured to control operation of the toe adjustment assembly to change the toe angle of one or more of the first wheels and/or one or more the second wheels, such that an amount of toe-in of the first wheels and/or the second wheels is increased when the one or more signals indicative of speed indicates a vehicle speed greater than a threshold speed. Toe-in may improve straight-line stability of the vehicle.

In some examples of the wheel control system, the wheel control system may include a wheel controller configured to be coupled proximate to the first end of the vehicle and control steering angles and one or more of a toe angle, camber angle, or caster angle of first wheels coupled proximate to the first end of the vehicle. The wheel controller may also be configured to determine misalignment of one or more of at least one of the first wheels or at least one of the second wheels while the vehicle is travelling, and at least one of reduce or eliminate the misalignment. For example, the wheel controller may be configured to receive a signal indicative of the misalignment, and the signal indicative of the misalignment may be based at least in part on a signal generated by a localization system. In some examples, the localization system may be configured to determine one or more of a position or orientation of the vehicle based at least in part on one or more sensors coupled to the vehicle. The one or more sensors may include one or more of a global positioning system, an inertial measurement unit, a LIDAR, or a camera.

In some examples, the wheel controller may be configured to control toe angles of a first side wheel and a second side wheel of the first wheels (e.g., the left and right front wheels), so that the toe angles are the same magnitude in opposite directions. In some examples, the wheel controller may be configured to control camber angles of the first side wheel and the second side wheel of the first wheels, so that the camber angles are the same magnitude in opposite directions. In some examples, the wheel controller may be configured to control caster angles of the first side wheel and the second side wheel of the first wheels, so that the caster angles are the same magnitude in the same direction. This may result in alignment of the wheels of the vehicle. In some examples, the toe, caster, and/or camber angles of the first and second side wheels of the second wheels (e.g., the left and right rear wheels) may be aligned in an at least similar manner.

In some examples, the wheel control system may include a first steering assembly configured to be coupled proximate to the first end of the vehicle and control steering angles of first wheels coupled proximate to the first end of the vehicle. The wheel control system may also include a second steering assembly configured to be coupled proximate to the second end of the vehicle and control steering angles of second wheels coupled proximate to the second end of the vehicle. The wheel controller may be configured to receive a signal indicative of at least one of torque supplied to the first wheels and the second wheels, a lateral force associated with at least one of the first steering assembly or the second steering assembly, or a deviation from the direction of travel aligned with the longitudinal axis of the vehicle. In some examples, the wheel controller may be configured to control, based at least in part on the one or more signals, one or more of the steering angles, toe angles, the camber angles, or the caster angles of one or more of at least one of the first wheels or at least one of the second wheels.

In some examples, the wheel controller may be configured to receive a signal indicative of a direction of travel of the vehicle and a signal indicative of a direction defined by the longitudinal axis of the vehicle, and determine, based at least in part on the signal indicative of the direction of travel of the vehicle and the signal indicative of a direction defined by the longitudinal axis of the vehicle, misalignment of one or more of at least one of the first wheels or at least one of the second wheels. The wheel controller may also be configured to at least one of reduce or eliminate the misalignment based at least in part in part on the signals.

In some examples, the wheel control system may include a first steering assembly including a first steering rack configured to be coupled to each of the first wheels and control orientation of the first wheels relative to the longitudinal axis of the vehicle. The system may also include a second steering assembly including a second steering rack configured to be coupled to each of the second wheels and control orientation of the second wheels relative to the longitudinal axis. In some such systems, the wheel controller may be configured to control operation of the first steering rack and the second steering rack to align the first wheels and the second wheels with the longitudinal axis of the vehicle. For example, one or more of the first steering rack or the second steering rack may define respective zero positions intended to align the associated first wheels and second wheels with the longitudinal axis of the vehicle. In some examples, the wheel controller may be configured to adjust the zero positions of one or more of the first steering rack or the second steering rack, so that each of the first wheels and each of the second wheels is aligned with the longitudinal axis of the vehicle, for example, within technical tolerances.

In some examples, the wheel controller may be configured to at least one of control the first steering assembly to change the first steering angles of the first wheels in a first direction, or control the second steering assembly to change the second steering angles of the second wheels in a second direction having the same sign as the first direction. In some examples, the wheel controller may be configured to at least one of control the first steering assembly to change the first steering angles of the first wheels in a first direction, or control the second steering assembly to change the second steering angles of the second wheels in a second direction having the opposite sign as the first direction.

In some examples of the wheel control system, the wheel controller may be configured to receive one or more signals indicative of a direction of travel of the vehicle and one or more signals indicative of a direction defined by the longitudinal axis of the vehicle. In such examples, the wheel controller may be configured to determine, based at least in part on the one or more signals indicative of a direction of travel of the vehicle and the one or more signals indicative of the direction defined by the longitudinal axis of the vehicle, misalignment between the direction of travel of the vehicle and the direction defined by the longitudinal axis of the vehicle. The wheel controller, in some examples, may be configured to control the first steering assembly and the second steering assembly to reduce or eliminate the misalignment between the direction of travel of the vehicle and the direction defined by the longitudinal axis of the vehicle.

In some examples, the wheel control system may include, or be in communication with, a global positioning system, and the one or more signals indicative of the direction of travel of the vehicle may be based at least in part on one or more signals generated by the global positioning system. In some examples, the wheel control system may include, or be in communication with, a sensor configured to generate one or more signals indicative of the direction defined by the longitudinal axis of the vehicle the longitudinal axis of the vehicle, and the one or more signals indicative of the direction defined by the longitudinal axis of the vehicle may be based at least in part on one or more signals received from the sensor. In some examples, the wheel controller may be configured to control the first steering assembly to change the first steering angles of the first wheels in a first direction, and control the second steering assembly to change the second steering angles of the second wheels in a direction consistent with the first direction. For example, the first and second steering angles may be the same.

This disclosure is also generally directed to a system for estimating tire-surface parameterization data associated with a surface on which a vehicle travels. In some examples, the system may include a wheel controller configured to control at least one wheel parameter associated with a tire of the vehicle. The at least one wheel parameter may include at least one of a steering angle, caster angle, camber angle, toe angle, or wheel speed of the one or more wheels. The wheel controller may be configured to induce a change of at least one wheel parameter associated with the tire, and receive a signal indicative of the change of state of the vehicle. The change of state may include at least one of the direction of travel of the vehicle, the speed of the vehicle, the steering angle of the vehicle, or an instability of the vehicle. The wheel controller may also be configured to estimate tire-surface parameterization data associated with the tire and the surface based at least in part on the signal. For example, the wheel controller may be configured to estimate tire-surface parameterization data, such as, for example, friction-related data (e.g., static and/or dynamic coefficients of friction, including linear and non-linear tire behavior), tire cornering stiffness, side slip force, tire slip angles, or the like, associated with interaction between the tire and the surface.

In some examples, the system may include a first steering assembly configured to be coupled to a first tire proximate to a first end of the vehicle, and a first brake configured to be coupled to the first tire and slow rotation of the first tire. The system may also include a second steering assembly configured to be coupled to a second tire of the vehicle, and a tire-surface parameterization estimator. The wheel controller, in some examples, may be configured to activate at least one of the first steering assembly to change a steering angle associated with the first tire or activate the brake to slow rotation of the first tire. The wheel controller may also be configured to cause at least one of the second steering assembly to change a steering angle associated with the second tire to resist at least one of a change of speed or a change of direction of travel of the vehicle caused by activation first steering assembly or the brake. The tire-surface parameterization estimator may be configured to receive a signal indicative of at least one of the steering angle associated with the first tire or the speed of rotation of the first tire upon activation of at least one of the first steering assembly or the brake, respectively. The tire-surface parameterization estimator may also be configured to receive a signal indicative of the steering angle associated with the second tire, and estimate. The wheel controller may also be configured to estimate tire-surface parameterization data associated with the tire and the surface based at least in part on the signal data associated with the first tire and the surface based at least in part on the signals.

In some examples, the system may also include a motor configured to be coupled to the second tire and supply torque to the second tire. The wheel controller may be configured to activate at least one of the first steering assembly to change a steering angle associated with the first tire or activate the brake to slow rotation of the first tire, and cause at least one of the second steering assembly to change a steering angle associated with the second tire or the motor to supply torque to the second tire, to resist at least one of a change of speed or a change of direction of travel of the vehicle caused by activation first steering assembly or the brake. The tire-surface parameterization estimator may be configured to receive a signal indicative of at least one of the steering angle associated with the first tire or the speed of rotation of the first tire upon activation of at least one of the first steering assembly or the brake, respectively. The tire-surface parameterization estimator may also be configured to receive a signal indicative of at least one of the steering angle associated with the second tire or the torque applied to the second tire, and estimate tire-surface parameterization data associated with the first tire and the surface based at least in part on the signals.

In some examples, the wheel controller may be configured to activate the brake to cause the first tire to stop rotating, and the tire-surface parameterization estimator may be configured to receive a signal indicative of the speed of rotation of the first tire as the first tire slows to a stop and determine the tire-surface parameterization data based at least in part on the signal indicative of the speed of rotation as the first tire slows to a stop and the signal indicative of at least one of the steering angle associated with the second tire or the torque applied to the second tire. The tire-surface parameterization estimator, in some examples, may be configured to estimate the coefficient of static friction between the tire and the surface based as least in part on the tire-surface parameterization data. In some examples, the tire-surface parameterization estimator may be configured to determine the tire-surface parameterization data based at least in part on the signal indicative of at least one of the steering angle associated with the second tire or the torque applied to the second tire. In some examples, the tire-surface parameterization estimator may be configured to estimate a coefficient of dynamic friction between the tire and the surface based as least in part on the tire-surface parameterization data.

Some examples of the system may include a reporting module in communication with a communication network and configured to communicate, to one or more of network-based data stores or other vehicles, data correlating a location of the vehicle and the tire-surface parameterization-related data via the communication network. In such examples, the tire-surface parameterization data may be used by other vehicles and/or other parties.

In some examples of the system for estimating tire-surface parameterization, the system may include a brake coupled to a first tire and configured to slow rotation of the first tire, and a motor coupled to a second tire and configured to supply torque to the second tire. The system may also include a wheel controller configured to activate the brake to cause rotation of the first tire to slow, and cause the motor to supply torque to the second tire to resist slowing of the vehicle caused by activation of the brake. The system may also include a tire-surface parameterization estimator configured to receive one or more signals indicative of the speed of rotation of the first tire during the braking, and receive one or more signals indicative of a braking force on the first tire during the braking. Based at least in part on one or more of the signals indicative of the speed of rotation of the first tire or indicative of the braking force on the first tire, the tire-surface parameterization estimator may be configured to estimate tire-surface parameterization data associated with the surface. In some examples, the tire-surface parameterization data may include a friction coefficient (e.g., a static or a dynamic friction coefficient) between the surface and one or more tires of the vehicle. In some examples, the brake may include a brake that is part of a regenerative braking system.

In some examples, the tire-surface parameterization data may be used by the vehicle to determine performance parameters for the vehicle, such as, for example, maximum accelerations for increasing vehicle speed, maximum accelerations for reducing vehicle speed, maximum cornering speeds, etc. In some examples, the tire-surface parameterization data may be correlated to the location of the vehicle and may be communicated via a communication network for use by other parties and/or other vehicles. For example, the tire-surface parameterization data estimated by the vehicle may be used by other vehicles that are in communication with the communication network. Some examples of the system for estimating tire-surface parameterization data may also include a reporting module in communication with a communication network. The reporting module may be configured to communicate data correlating the location of the vehicle and the tire-surface parameterization data via the communication network.

Some examples of the system for estimating tire-surface parameterization data may include a steering assembly configured to be coupled proximate to an end of the vehicle and independently control a first steering angle of a first tire coupled proximate to the end of the vehicle and a second steering angle of a second tire coupled proximate to the end of the vehicle. For example, the steering assembly may be configured to control the first steering angle so that the first tire is at a first steering angle, while the second tire is at a second steering angle. In some examples, the steering assembly may be configured to change the first steering angle without changing the second steering angle, and/or change the second steering angle without changing the first steering angle. For example, the system for estimating tire-surface parameterization data may also include a wheel controller configured to cause the steering assembly to change the first steering angle, so that the first steering angle and the second steering angle differ from one another. The system for estimating tire-surface parameterization data may also include a tire-surface parameterization estimator configured to receive one or more signals indicative of a lateral force on the first tire, and estimate tire-surface parameterization data associated with the surface based at least in part on the one or more signals indicative of the lateral force on the first tire.

In some examples of the system for estimating tire-surface parameterization data, the steering assembly may include a steering actuator coupled to the first tire, and the one or more signals indicative of the lateral force on the first tire may be based at least in part on one or more signals indicative of a force acting on the steering actuator. Some examples of the system for estimating tire-surface parameterization data may include a motor configured to supply torque to cause the vehicle to move, and the one or more signals indicative of the lateral force on the first tire may be based at least in part on one or more signals indicative of a change in torque supplied by the motor to maintain the speed of the vehicle when the steering assembly changes the steering angle of the first tire, or a deceleration of the vehicle where no additional torque is supplied. Some examples of the system for estimating tire-surface parameterization data may include a sensor coupled to the steering assembly and configured to generate the one or more signals indicative of the lateral force on the first tire.

The techniques and systems described herein may be implemented in a number of ways. Example implementations are provided below with reference to the figures.

FIG. 1 is a perspective view of an example vehicle 100 including example vehicle systems 102 shown in block diagram form. The example vehicle 100 may be configured to travel via a road network 104 from one geographic location to a destination carrying one or more occupants. For the purpose of illustration, the vehicle 100 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with an occupant not being expected to control the vehicle at any time. In such examples, because the vehicle 100 may be configured to control all functions from start to completion of the trip, including all parking functions, it may not include a driver and/or controls for driving the vehicle 100, such as a steering wheel, an acceleration pedal, and/or a brake pedal. This is merely an example, and the example vehicle 100 may be any configuration of vehicle, such as, for example, a van, a sport utility vehicle, a cross-over vehicle, a truck, a bus, an agricultural vehicle, or a construction vehicle, such a vehicle operating according to any level of autonomy (e.g., Level 0 being fully manually operated to Level 5, as indicated above).

The vehicle 100 may be powered by one or more internal combustion engines, one or more electric motors, hydrogen power, any combination thereof, and/or any other suitable power sources. Although the example vehicle 100 has four wheels 106 and four tires 108 respectively mounted on the wheels 106, the systems and methods described herein may be incorporated into vehicles having fewer or a greater number of wheels, tires, and/or tracks. The example vehicle 100 may have four-wheel steering and may operate generally with equal performance characteristics in all directions, for example, such that a first end 110 of the vehicle 100 is the front end of the vehicle 100 when traveling in a first travel direction 112, and such that the first end 110 becomes the rear end of the vehicle 100 when traveling in the opposite, second travel direction 114, as shown in FIG. 1. Similarly, a second end 116 of the vehicle 100 is the front end of the vehicle 100 when traveling in the second travel direction 114, and such that the second end 116 becomes the rear end of the vehicle 100 when traveling in the opposite, first travel direction 112. These example characteristics may facilitate greater maneuverability, for example, in small spaces or crowded environments, such as urban areas and parking lots.

As shown in FIG. 1, the vehicle 100 includes a chassis 118 coupled to the four wheels 106 and configured to carry and protect the occupants of the vehicle 100 as it travels from a location to a destination via a route on the road network 104. The example vehicle systems 102 of the vehicle 100 include a drive system 120 configured to control maneuvering and/or related operations of the vehicle 100. As shown in FIG. 1, the drive system 120 may include a wheel control system 122 configured to control operations associated with steering the wheels 106 of the vehicle 100. In some examples, the wheel control system 122 may include a wheel controller 124 configured to control operation of one or more steering assemblies 126 coupled to the wheels 106 and chassis 118 of the vehicle 100. For example, the wheel controller 124 may control operation of one or more steering assemblies 126 to change steering angles associated with one or more of the wheels 106. The wheel control system 122 may also include a rollover prevention system 128 configured to prevent roll over of the vehicle 100 (or at least reduce the likelihood that the vehicle 100 will roll over).

The example wheel control system 122 may also include a braking system 130 configured to control vehicle operations related to slowing the rotation of one or more wheels 106 of the vehicle 100. In some examples, the braking system 130 may include one or more brakes associated with each of the wheels 106. The brakes, in some examples, may include regenerative braking devices, such as electric machines configured to convert the kinetic energy associated with rotation of the wheels 106 into electric energy. Additionally, or alternatively, the brakes may include a friction braking device, such as a caliper. The example wheel control system 122 also includes an acceleration system 132 coupled to the chassis and configured to cause one of more wheels 106 of the vehicle 100 to provide movement of the vehicle 100, which may include supplying torque to one or more wheels 106 of the vehicle 100. The acceleration system 132 may include one or more electric motors coupled to one or more of the wheels 106. In some examples, the rollover prevention system 128 may incorporate the braking system 130 and/or the acceleration system 132.

Some examples of the wheel control system 122 may include a system for estimating tire-surface parameterization data 134 associated with the surface on which the vehicle 100 travels (e.g., the road network 104). In some examples, the system for estimating tire-surface parameterization data 134 may include a tire-surface parameterization estimator 136 configured to receive one or more signals from components of the vehicle systems 102 and estimate tire-surface parameterization data associated with the surface on which the vehicle 100 travels. In some examples, the system for estimating tire-surface parameterization data 134 may incorporate one or more aspects of the wheel control system 122, the braking system 130, and/or the acceleration system 132, for example, as described herein. In some examples, the wheel control system 122 may also include a reporting module 138 in communication with a communication network and configured to communicate data correlating the location of the vehicle 100 and the tire-surface parameterization data via the communication network.

In some examples, the wheel control system 122 may also include a caster adjustment assembly 140 coupled to one or more of the steering assemblies 126 and configured to change the caster angle associated with one or more of the wheels 106 of the vehicle 100. This may facilitate improving the stability of the vehicle 100 under certain operating conditions. Some examples of the wheel control system 122 may also include a camber adjustment assembly 142 coupled to one or more steering assemblies 126 of the vehicle 100. The camber adjustment assembly 142 may be configured to change the camber angle associated with one or more wheels 106 of the vehicle 100, which may improve handling of the vehicle 100, for example, as it travels through curves in the road network 104. In some examples, the wheel control system 122 may also include a toe adjustment assembly 144 coupled to one or more of the steering assemblies 126. The toe adjustment assembly 144 may be configured to change the toe angle associated with one or more of the wheels 106, which may improve the stability and/or responsiveness of the handling of the vehicle 100.

Figure 2:
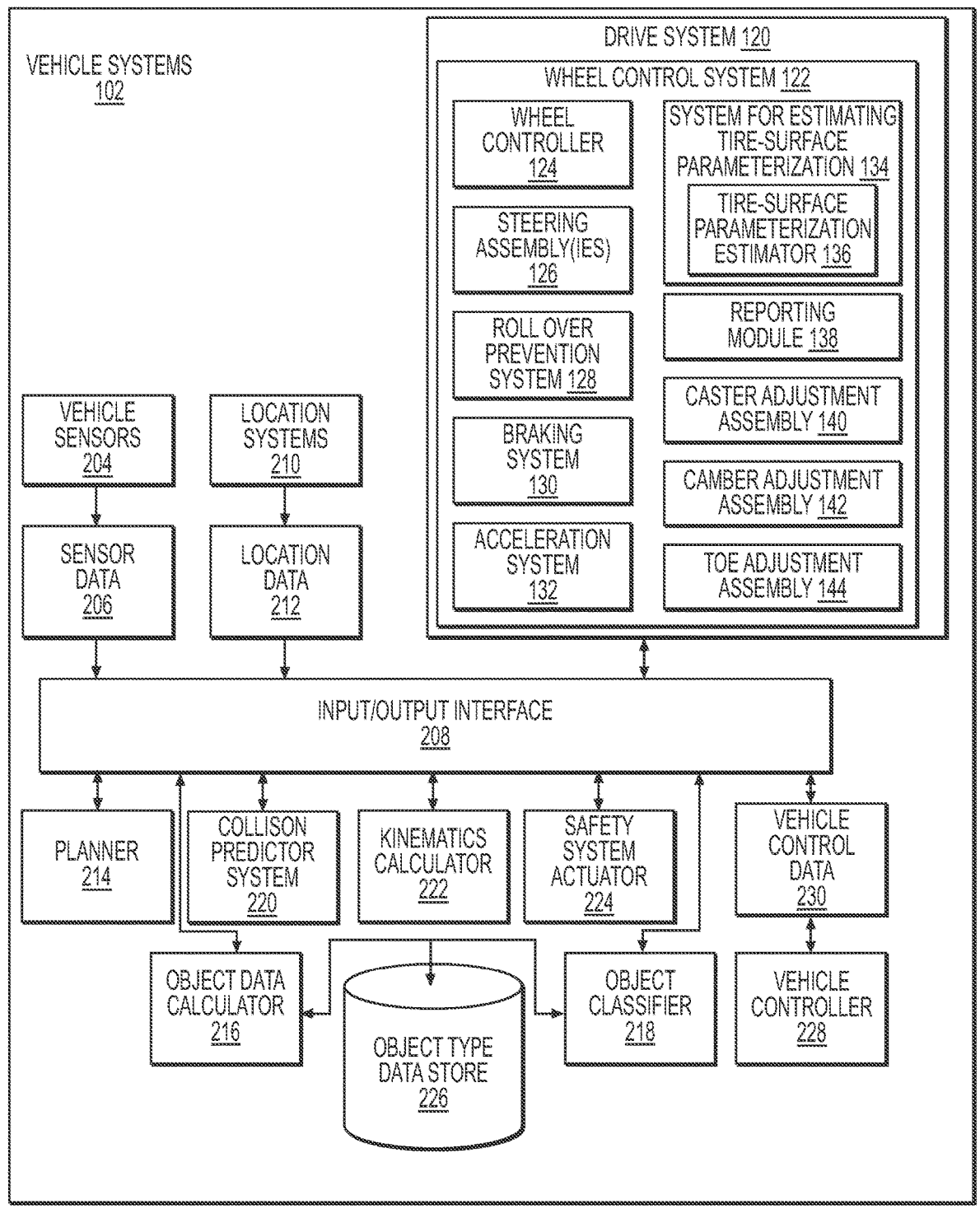
FIG. 2 is a block diagram showing an example architecture for the vehicle systems and an example architecture for a drive system.

FIG. 2 is a block diagram of an example architecture 200 including vehicle systems 102 for controlling operation of the systems that provide data associated with operation of the vehicle 100, and that control operation of the vehicle 100. In various implementations, the architecture 200 may be implemented using a uniprocessor system including one processor, or a multiprocessor system including several processors (e.g., two, four, eight, or another suitable number). The processor(s) may be any suitable processor capable of executing instructions. For example, in various implementations, the processor(s) may be general-purpose or embedded processors implementing any of a variety of instruction set architectures (ISAs), such as the x86, PowerPC, SPARC, FPGA, ASIC, or MIPS ISAs, or any other suitable ISA. In multiprocessor systems, each processor may commonly, but not necessarily, implement the same ISA. In some examples, the processor(s) may include a central processing unit (CPU), a graphics processing unit (GPU), or a combination thereof.

The example architecture 200 may include a non-transitory computer readable media configured to store executable instructions/modules, data, and/or data items accessible by the processor(s). In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, and/or data may be received, sent, or stored on different types of computer-accessible media, such as non-transitory media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the architecture 200 via an I/O interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In some implementations, the I/O interface may be configured to coordinate I/O traffic between the processor(s), the non-transitory computer readable media, and any peripheral devices, the network interface, or other peripheral interfaces, such as input/output devices. In some implementations, the I/O interface may perform any necessary protocol, timing, or other data transformations to convert data signals from one component (e.g., the non-transitory computer readable media) into a format suitable for use by another component (e.g., processor(s)). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all the functionality of the I/O interface, such as an interface to the non-transitory computer readable media, may be incorporated directly into the processor(s).

In the example architecture 200 shown in FIG. 2, the example vehicle systems 102 include a plurality of vehicle sensors 204, for example, configured to sense movement of the vehicle 100 through the environment, sense environmental data, such as the ambient temperature, pressure, and humidity, and/or sense objects in the environment surrounding the vehicle 100. In some examples, the vehicle sensors 204 may include sensors configured to identify a location on a map. The vehicle sensors 204 may include, for example, one or more light detection and ranging sensors (LIDAR), one or more cameras (e.g., RGB-cameras, intensity (grey scale) cameras, infrared cameras, depth cameras, stereo cameras, and the like), one or more radio detection and ranging sensors (RADAR), one or more sound navigation and ranging sensors (SONAR), one or more microphones for sensing sounds in the environment, such as sirens from law enforcement and emergency vehicles, and other sensors related to the operation of the vehicle 100. Other sensors may include a speed sensor, sensors related to operation of internal combustion engines and/or electric motors, sensors related to the tires to detect tire temperature, tire pressure, and tread depth, and/or brake-related sensors for detecting brake temperatures and/or wear, and in vehicles having regenerative braking, sensors for detecting parameters related to operation of the regenerative braking system. The vehicle sensors 204 may also include, for example, inertial measurement units (IMUs), accelerometers, gyroscopes, and magnetometers. The vehicle sensors 204 may be configured to provide sensor data 206 representative of the sensed objects and signals to the vehicle systems 102 via, for example, an input/output (I/O) interface 208. Other types of sensors and sensor data are contemplated.

The example vehicle systems 102 also include location systems 210 configured to receive location information, including position and/or orientation data (e.g., a local position or local pose) from the vehicle sensors 204 and/or external sources, and provide location data 212 to other portions of the vehicle systems 102 via the I/O interface 208. The external sources may include global satellites for facilitating operation of a global positioning system (GPS) and/or a wireless network for communicating and receiving information related to the vehicle's location, such as map data. The location systems 210 may also include sensors configured to assist with navigation of the vehicle 100, such as wheel encoders for sensing the rotation of the wheels, inertial navigation sensors, such as gyroscopes and/or accelerometers, magnetometers, and/or cameras for obtaining image data for visual odometry or visio-inertial navigation.

The example vehicle systems 102 may also include one or more of a planner 214, an object data calculator 216, an object classifier 218, a collision predictor system 220, a kinematics calculator 222, and a safety system actuator 224. The vehicle systems 102 may be configured to access one or more data stores including, but not limited to, an object type data store 226. The object type data store 226 may include data representing object types associated with object classifications for objects detected in the environment.

The example vehicle systems 102 shown in FIG. 2 also includes a vehicle controller 228 configured to receive vehicle control data 230, and based on the vehicle control data 230, communicate with the drive system 120, which may include one or more of the wheel control system 122, the wheel controller 124, the one or more steering assemblies 126, the rollover prevention system 128, the braking system 130, the acceleration system 132, the system for estimating tire-surface parameterization data 134, the tire-surface parameterization estimator 136, the caster adjustment assembly 140, the camber adjustment assembly 142, and the toe adjustment assembly 144 to control operation of the vehicle 100. For example, the vehicle control data 230 may be based at least in part on data received from one of more of the vehicle sensors 204 and one or more of the planner 214, the object data calculator 216, the object classifier 218, the collision predictor system 220, the kinematics calculator 222, and the safety system actuator 224, and control operation of the drive system 120, to execute operation and maneuvering of the vehicle 100.

In some examples, the planner 214 may be configured to generate data representative of a trajectory of the vehicle 100, for example, using data representing a location of the vehicle 100 in the environment and other data, such as local pose data that may be included in the location data 212. In some examples, the planner 214 may also be configured to determine projected trajectories predicted to be executed by the vehicle 100. The planner 214 may, in some examples, be configured to calculate data associated with a predicted motion of an object in the environment, and may determine a predicted object path associated with the predicted motion of the object. In some examples, the object path may include the predicted object path. In some examples, the object path may include a predicted object trajectory. In some examples, the planner 214 may be configured to predict more than a single predicted object trajectory. For example, the planner 214 may be configured to predict multiple object trajectories based on, for example, probabilistic determinations or multi-modal distributions of predicted positions, trajectories, and/or velocities associated with an object.

In some examples, the object data calculator 216 may be configured to provide data representative of, for example, one or more of the pose (e.g., position and orientation) of an object in the environment surrounding the vehicle 100, an object track associated with the object (e.g., a historic position, velocity, acceleration, and/or heading of the object over a period of time (e.g., 5 seconds)), and an object classification associated with the object (e.g., a pedestrian, a vehicle, a bicyclist, etc.). For example, the object data calculator 216 may be configured to receive data in the form of sensor signals received from one or more of the vehicle sensors 204 and determine data representing one or more of the position and/or orientation in the environment of the object, the object track, and the object classification.

In some examples, the object classifier 218 may be configured to access data from the object type data store 226, which may be configured to store data representing object types, such as, for example, a species of an object classification, a subclass of an object classification, and/or a subset of an object classification. The object classifier 218, in some examples, may be configured to analyze data representing an object track and data representing an object classification with data representing an object type, and determine an object type based at least in part on the object track and classification data. For example, a detected object having an object classification of an "automobile" may have an object type of "sedan," "coupe," "hatch-back," "sports utility vehicle," "pick-up truck," or "minivan." An object type may include additional subclasses, designations, or subsets. For example, a "sedan" that is parked may have an additional subclass designation of being "static" or "being dynamic" if moving. In some examples, such an object classifier 218 may also determine a predicted object behavior based on one or more of a portion of the sensor data 206 or the object type.

In some examples, the collision predictor system 220 may be configured to use the predicted object behavior, the data representing the object type, the data representing the trajectory of the object, and/or the data representing the trajectory of the vehicle 100, to predict a collision between the vehicle 100 and the object.

In some examples, the kinematics calculator 222 may be configured to determine data representing one or more scalar and/or vector quantities associated with motion of objects in the environment, including, but not limited to, velocity, speed, acceleration, momentum, local pose, and/or force. Data from the kinematics calculator 222 may be used to compute other data, including, but not limited to, data representing an estimated time to impact between an object and the vehicle 100, and data representing a distance between the object and the vehicle 100. In some examples, the planner 214 may use data produced by the kinematics calculator 222 to estimate predicted object data. For example, the planner 214 may use current scalar and/or vector quantities associated with an object to determine a likelihood that other objects in the environment (e.g., cars, motorcyclists, pedestrians, bicyclists, and animals) are moving in an alert or controlled state, versus an un-alert or uncontrolled state. For example, the kinematics calculator 222 may be configured estimate the probability that other objects are moving as though they are being controlled and/or are behaving in a predictable manner, or whether they are not being controlled and/or behaving in an unpredictable manner, for example, by observing motion of the object over time and relative to other objects in the environment. For example, if the objects are moving erratically or without appearing to adjust to the presence or motion of other objects in the environment, this may be an indication that the objects are either uncontrolled or moving in an unpredictable manner. This may be inferred based on sensor data received over time that may be used to estimate or predict a future location of the object relative to a current or future trajectory of the vehicle 100.

In some examples, the safety system actuator 224 may be configured to activate one or more safety systems of the vehicle 100 when a collision is predicted by the collision predictor system 220 and/or the occurrence of other safety related events, such as, for example, an emergency maneuver by the vehicle 100, such as hard braking or a sharp acceleration. The safety system actuator 224 may be configured to activate an interior safety system (e.g., tensioning seat belts, deploying air bags, deploying curtains, providing audible alerts, and the like), an exterior safety system (e.g., including warning sounds and/or warning lights), the drive system 120, which may be configured to execute an emergency maneuver to avoid a collision, and/or any combination thereof. For example, the drive system 120 may receive data for causing the wheel control system 122 of the vehicle 100 to change the travel direction of the vehicle 100, and an acceleration system of the vehicle 100 to change the speed of the vehicle 100 to alter the trajectory of vehicle 100 from an initial trajectory to a trajectory for avoiding a collision.

Some examples of the vehicle systems 102 may operate according to the following example. Data representing a trajectory of the vehicle 100 in the environment may be received by the drive system 120. Object data associated with an object in the environment may be calculated. Sensor data 206 from one or more of the vehicle sensors 204 may be used to calculate the object data. The object data may include data representing the location of the object in the environment, an object track associated with the object, such as whether the object is stationary or moving, and an object classification associated with the object, such as whether the object is another vehicle, a pedestrian, a bicyclist, an animal, or a stationary object. In some examples, the object data calculator 216, based on the object data, may be used to determine data representing the object's location in the environment, data representing whether the object is moving, and data representing a classification associated with the object.

In some examples, the planner 214 may use the object data to determine a predicted path of the object in the environment, for example, based on data representing the location of the object and may process that data to generate data representing a predicted object path. Data representing the type of object may be determined based on the data representing whether the object is moving, data representing the object's classification, and/or data representing object's type. A pedestrian not in motion, a vehicle in motion, and traffic sign, a lane marker, or a fire hydrant, none of which is in motion, are examples of object types with an associated motion data.

In some examples, the collision predictor system 220 may be used to predict a collision between the vehicle 100 and an object in the environment based on the object type, whether the object is moving, the trajectory of the vehicle 100, the predicted path of the object obtained from the planner 214. For example, a collision may be predicted based in part on the object type due to the object moving, the trajectory of the object being in potential conflict with the trajectory of the vehicle 100, and the object having an object classification that indicates the object is a likely collision threat. In some examples, such a collision prediction may also be based on a predicted object behavior. In some examples, each classification, or sub-classification, of objects may have a corresponding associated behavior. For example, a predicted behavior of a bicyclist is to travel in relatively straight lines having a maximum speed.

In some examples, the safety system actuator 224 may be configured to actuate one or more portions of a safety system of the vehicle 100 when a collision is predicted. For example, the safety system actuator 224 may activate one or more of the interior safety systems, one or more of the exterior safety systems, and one or more of the components of the drive system 120 (e.g., the wheel control system 122, the braking system 130, and/or the acceleration system 132) via the vehicle controller 228. In some examples, the vehicle controller 228 may determine that the interior safety system will be activated based on some action of an object in the environment, and the vehicle control data 230 may include information configured to cause the vehicle controller 228 to activate one or more functions of the interior safety system, the exterior safety system, and the drive system 120.

Figure 3A:
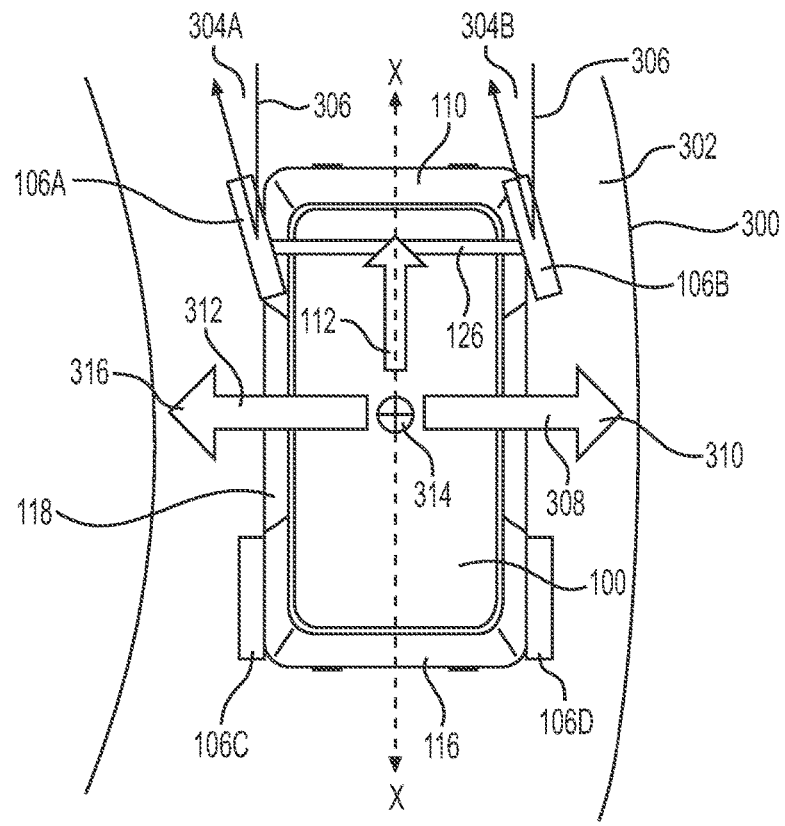
FIG. 3A is a schematic overhead view of an example vehicle maneuvering through an example curve in the road.

FIG. 3A is a schematic overhead view of an example vehicle 100 maneuvering through an example curve 300 in the road 302 of the road network 104. In the example shown, the vehicle 100 is traveling in a first travel direction 112, such that the first end 110 of the vehicle 100 is the front end of the vehicle 100 as it maneuvers through the curve 300. The vehicle 100 includes first wheels 106A and 106B coupled proximate to the first end 110 of the vehicle 100, and second wheels 106C and 106D coupled proximate to the second end 116 of the vehicle 100. In the example shown, a steering assembly 126 couples the first wheels 106A and 106B to the chassis 118 and controls the steering angles 304A and 304B of the first wheels 106A and 106B, respectively. The steering angles 304A and 304B may be measured relative to a longitudinal axis X of the vehicle 100, which may correspond to the centerline of the vehicle 100. For example, the longitudinal axis X may be contained in a plane extending through the centerline of the vehicle 100. As shown in FIG. 3A, the steering angles 304A and 304B may be measured relative to a neutral or "zero" position 306, which is parallel to the longitudinal axis X of the vehicle 100 and which may be consistent with straight-ahead travel.

Although the steering assembly 126 is schematically depicted in a manner that suggests the steering assembly 126 is a single unitary part, the steering assembly 126 may include a plurality of parts, and in some examples, the steering assembly 126 may be configured so that the steering angle 304A of the first wheel 106A and the steering angle 304B of the first wheel 106B may be changed independently of one another, for example, as described herein. In some examples, the steering assembly 126 may be configured so that the steering angle 304A of the first wheel 106A and the steering angle 304B of the first wheel 106B may be changed together.

As the vehicle 100 travels through the curve 300, it may be subjected to a lateral force 308 acting in a first direction 310 transverse to the longitudinal axis X of the vehicle 100. For example, the lateral force 308 may result from the lateral acceleration 312 of the vehicle 100 acting, for example, at the center of gravity 314 in a second direction 316 toward the center of the curve 300.

Figure 3B:
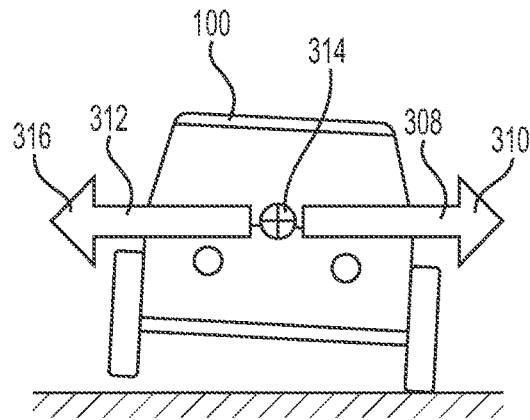
FIG. 3B is a schematic rear view of the vehicle shown in FIG. 3A with an example lateral force acting on the vehicle.
Figure 3C:
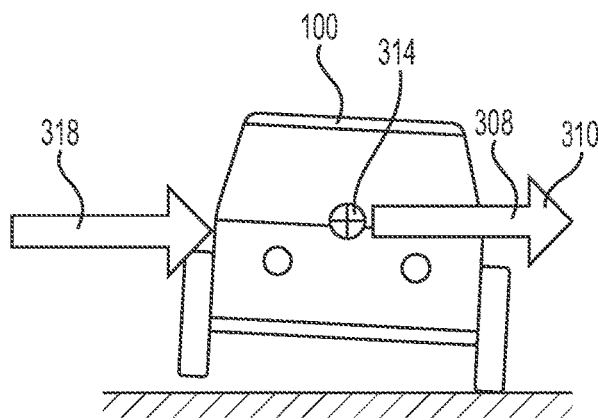
FIG. 3C is a schematic rear view of the vehicle shown in FIG. 3A with another example lateral force acting on the vehicle.

As shown in FIGS. 3B and 3C, the lateral force 308 may provide a tipping force tending to cause the vehicle 100 to roll over in the first direction 310 if sufficient to overcome the weight of the vehicle 100 and cause the wheels 106 on the side of the vehicle 100 toward the inside of the curve 300 to lift off the surface of the road 302. As shown in FIG. 3B, the lateral force 308 may result (e.g., solely) from the lateral acceleration 312 of the vehicle 100 as it travels through the curve 300. Other sources of the lateral force 308 may act on the vehicle 100, such as, for example, a collision force 318 resulting from contact with another object, such as another vehicle, or a high cross-wind, for example, as schematically depicted in FIG. 3C. The other sources may act alone or in combination with a lateral force due to lateral acceleration, depending on whether the vehicle is traveling through a curve and the direction of the curve.

Figure 4A:
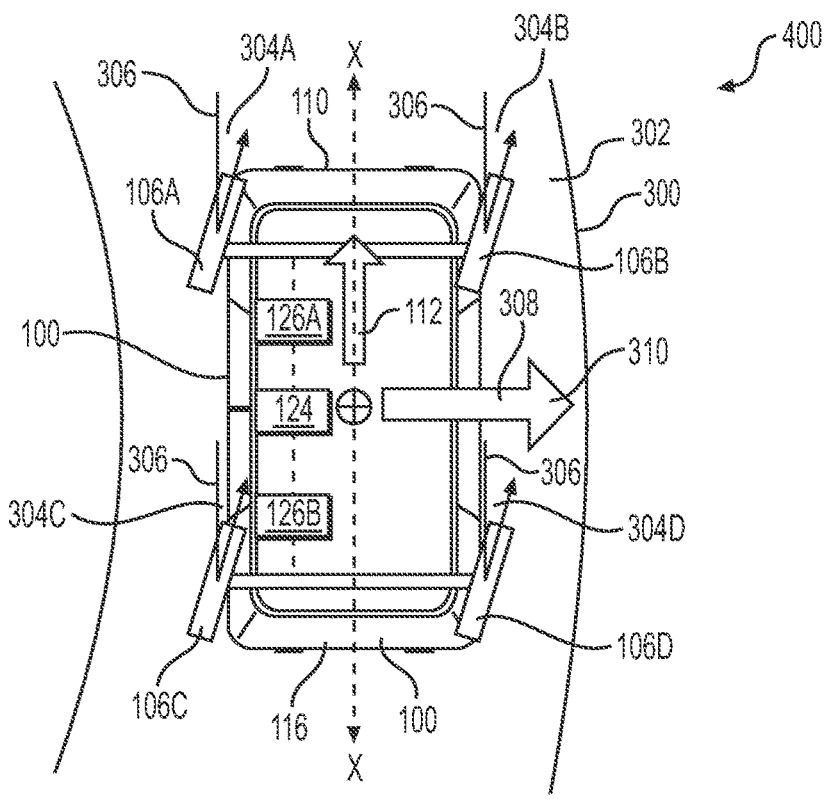
FIG. 4A is a schematic overhead view an example vehicle performing an example response to an example lateral force.
Figure 4B:
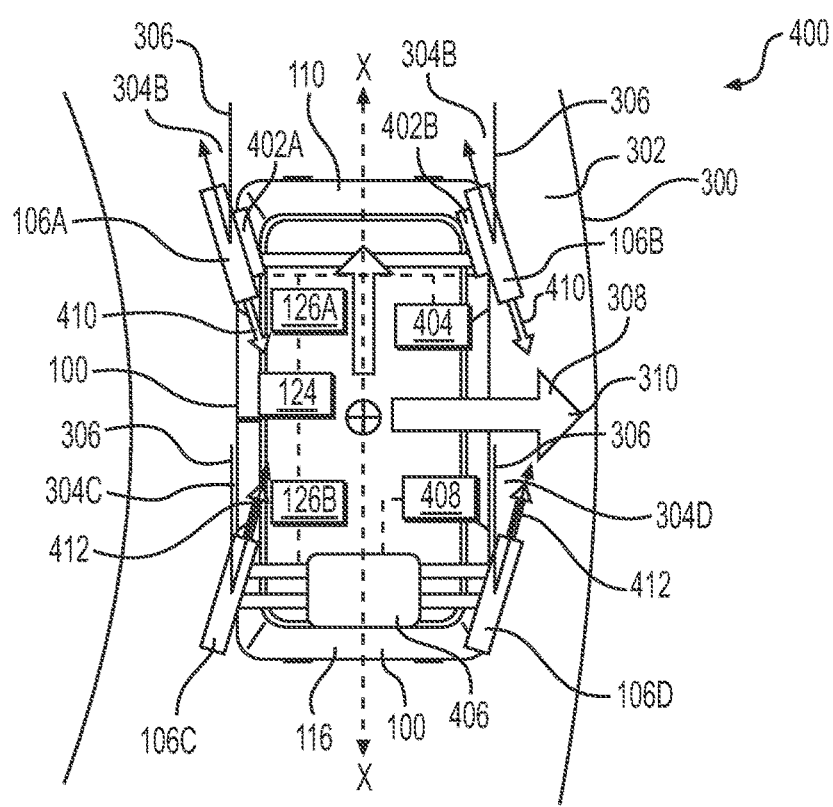
FIG. 4B is a schematic overhead view an example vehicle performing another example response to an example lateral force.

FIGS. 4A and 4B are schematic overhead views of example vehicles 100 performing two example responses to example lateral forces 308 in an example environment 400. Some examples of the vehicle 100 may include a wheel control system 122 (see FIGS. 1 and 2) configured to facilitate control of the vehicle 100. In the examples shown in FIGS. 4A and 4B, the wheel control system 122 may include a first steering assembly 126A coupled proximate to the first end 110 of the vehicle 100 and configured to control the steering angles 304A and 304B of the first wheels 106A and 106B coupled proximate to the first end 110 of the vehicle 100. In some examples, the wheel control system 122 may also include a second steering assembly 126B coupled proximate to the second end 116 of the vehicle 100 and configured to control the steering angles 304C and 304D of the second wheels 106C and 106D coupled proximate to the second end 116 of the vehicle 100. The wheel control system 122 may also include a wheel controller 124 configured to receive one or more signals indicative of the lateral force 308 acting on the vehicle 100 in the first direction 310 transverse to the longitudinal axis X of the vehicle 100. Such signal(s) may be generated via a sensor configured to generate such signals, such as, for example, one or more the vehicle sensors 204 (see FIG. 2). For example, the signals may be generated by one or more of inertial measurement units (IMUS) accelerometers, gyroscopes, magnetometers, pose estimation, etc. In some examples, the wheel controller 124 may be configured to determine, based at least in part on the one or more signals, when the lateral force 308 exceeds a threshold force sufficient to cause the vehicle 100 to roll over in the first direction 310. In some examples, the threshold force may be determined based on the moments of inertia of the vehicle 100 and/or a center of gravity of the vehicle 100, as well as a function of vehicle speed, and an estimated friction associated with the surface. In some examples, the wheel controller 124 may be configured to control, when the lateral force 308 exceeds the threshold force, one or more of the first steering assembly 126A or the second steering assembly 126B to reduce the lateral force to less than the threshold force to prevent the vehicle 100 from rolling over (or at least reduce the likelihood that the vehicle 100 will roll over).

In some examples, the wheel controller 124 may be configured to determine, based at least in part on the one or more signals, when the lateral force 308 exceeds a roll coefficient multiplied by a roll force sufficient to cause the vehicle 100 to roll over in the first direction 310. In some examples, the roll coefficient may range from greater than zero to 1.0. Some examples of the roll coefficient may account for one or more safety factors. Other factors may be reflected in the roll coefficient. In some examples, the roll force may be predetermined, for example, based on characteristics of the vehicle 100 (e.g., physical characteristics, such as the weight, moment of inertia, center of gravity, and/or the roll center of the vehicle 100), and/or the roll force may be determined in real-time while the vehicle 100 maneuvers, for example, based on one or more signals received from the vehicle sensors 204 (see FIG. 2). In some examples, the wheel controller 124 may be configured to control, when the lateral force 308 exceeds the roll coefficient multiplied by the roll force, one or more of the first steering assembly 126A or the second steering assembly 126B to reduce the lateral force to less than the roll coefficient multiplied by the roll force and prevent the vehicle 100 from rolling over (or at least reduce the likelihood that the vehicle 100 will roll over).

In some examples, the vehicle 100 may not calculate a lateral force, threshold force, or otherwise. The vehicle 100 may determine based on vehicle sensors 204 and drive system 102 that the vehicle 100 is progressing around a curve and that the orientation of the vehicle 100 is inclined with respect to a ground plane (i.e., it is rolling or beginning to roll). In such an example, signals indicative of the vehicle 100's orientation (e.g., pose data from localizations, IMU data, gyroscope data, magnetometer data, and the like) may be sent to the wheel control system 122 for use in the rollover prevention system 128.

Although the first and second steering assemblies 126A and 126B are schematically depicted in a manner that suggests they are single unitary parts, the first and second steering assemblies 126A and 126B may each include a plurality of parts, and in some examples, the first and second steering assemblies 126A and 126B may be configured so that the one or more steering angles 304 of the respective wheels 106 may be changed independently of one another, for example, as described herein. In some examples, the first and/or second steering assemblies 126A and/or 126B may be configured so that the steering angles 304 of two or more of the respective wheels 106 may be changed together.

In some examples, the lateral force 308 may result from the lateral acceleration 312 (see FIG. 3B), and the wheel controller 124 may be configured to control the first steering assembly 126A and/or the second steering assembly 126B to reduce the lateral acceleration 312 of the vehicle 100 to reduce the lateral force 308 to less than the threshold force. As mentioned herein, the lateral force 308 may result from other sources, such as a collision force 318 (see FIG. 3C), and the wheel controller 124 may be configured to control the first steering assembly 126A and/or the second steering assembly 126B to reduce the lateral force 308 resulting from the collision force 318 to less than the threshold force.

In some examples, the wheel controller 124 may be configured to control the first steering assembly 126A and/or the second steering assembly 126B to reduce the lateral acceleration 312 of the vehicle 100 to reduce the lateral force 308 to less than the roll coefficient multiplied by the roll force and prevent the vehicle from rolling over. As mentioned herein, the lateral force 308 may result from other sources, such as a collision force 318 (see FIG. 3C), and the wheel controller 124 may be configured to control the first steering assembly 126A and/or the second steering assembly 126B to reduce the lateral force 308 resulting from the collision force 318 to less than the roll coefficient multiplied by the roll force.

In some examples, the wheel controller 124 may be configured to control the first steering assembly 126A and/or the second steering assembly 126B to reduce a deviation from an expected orientation of the vehicle 100.

For example, as shown in FIG. 4A, when the vehicle is traveling in the first travel 112 direction, such that the first end 110 of the vehicle 100 is the front end of the vehicle 100, the wheel controller 124 may be configured to cause the first steering assembly 126A to pivot the first wheels 106A coupled proximate to the front end of the vehicle 100 at respective first steering angles 304A and 304B relative to the respective zero positions 306, for example, relative to the first travel direction 112 of the vehicle 100. For example, as shown in FIG. 4A, the first steering angles 304A and 304B may range from about 5 degrees to about 90 degrees from the zero positions 306, for example, in a direction toward the first direction 310 of the lateral force 308. In some examples, the wheel controller 124 may also be configured to cause the second steering assembly 126B to pivot the second wheels 106C and 106D at respective second steering angles 304C and 304D relative to the respective zero positions 306, for example, relative to the first travel direction 112 of the vehicle 100. For example, the second steering angles 304C and 304D may range from about 5 degrees to about 90 degrees from the zero positions 306, for example, in a direction toward the first direction 310 of the lateral force 308. For example, if the lateral force 308 acting on the vehicle 100 is toward the right side of the vehicle 100 as viewed from the passenger compartment and facing in the forward direction (e.g., as shown in FIG. 4A), the first steering angles 304A and 304B may result in the first wheels 106A and 106B pivoting toward the right, such that the front end of the vehicle 100 will steer toward the right. In some examples, for example as shown in FIG. 4A, the second steering angles 304C and 304D may result in the second wheels 106C and 106D pivoting toward the right, such that the second end 116 of the vehicle 100 will steer toward the right. In this example manner, the wheel control system 122 may reduce the lateral force 308 to less than the threshold force, or in some examples, the roll coefficient multiplied by the roll force, thereby preventing the vehicle 100 from rolling over (or at least reducing the likelihood that the vehicle 100 will roll over).

In some examples, when the vehicle 100 is traveling in a first travel direction 112, such that the first end 110 of the vehicle is the front end of the vehicle 100, the wheel controller 124 may be configured to cause the first steering assembly 126A to pivot the first wheels 106A and 106B in the opposite direction relative to the example shown in FIG. 4A. For example, as shown in FIG. 4B, the first steering angles 304A and 304B may range from about 1 degree to about 90 degrees from the first travel direction 112 and in a direction opposite the first direction 310 transverse to the longitudinal axis X of vehicle 100 (e.g., relative to the zero positions 306). The wheel controller 124 may also be configured to cause the second steering assembly 126B to pivot the second wheels 106C and 106D at second respective steering angles 304C and 304D relative to the first travel direction 112 of the vehicle 100. For example, as shown in FIG. 4B, the second steering angles 304C and 304D may range from about 5 degrees to about 90 degrees from the first travel direction 112 and toward the first direction 310 transverse to the longitudinal axis X of vehicle (e.g., relative to the zero positions 306). For example, if the lateral force 308 acting on the vehicle 100 is toward the right side of the vehicle 100 as viewed from the passenger compartment and facing in the first travel direction 112 (e.g., as shown in FIG. 4B), the first steering angles 304A and 304B may result in the first wheels 106A and 106B pivoting toward the left, such that the first end 110 of the vehicle 100 will steer toward the left, and the second steering angles 304C and 304D may result in the second wheels 106C and 106D pivoting toward the right, such that the second end 116 of the vehicle 100 will steer toward the right.

In some examples, the rollover prevention system 128 may be incorporated into the wheel control system 122 (see FIGS. 1 and 2). In some examples, the rollover prevention system 128 may incorporate the braking system 130 including respective brakes 402A and 402B configured to be coupled to the respective first wheels 106A and 106B of the vehicle 100. The braking system 130 may also include a braking controller 404 configured to control operation of the brakes 402A and 402B. In some examples, the braking controller 404 may be configured to cause rotation of at least one of the first wheels 106A and 106B to slow in response to receipt of one or more signals indicative of the lateral force exceeding the threshold force, or in some examples, the roll coefficient multiplied by the roll force.

Some examples of the rollover prevention system 128 may incorporate the acceleration system 132 (see FIGS. 1 and 2). The acceleration system 132 may include one or more motors 406 coupled to the second wheels 106C and 106D of the vehicle 100, and a motor controller 408 configured to cause the motor(s) 406 to supply torque to one or more of the second wheels 106C or 106D of the vehicle 100 in response to receipt of one or more signals indicative of the lateral force exceeding the threshold force, a deviation in orientation from an expected orientation, or in some examples, the roll coefficient multiplied by the roll force.

In some examples, the wheel control system 122, the braking system 130, and/or the acceleration system 132 may be used in combination to prevent the vehicle 100 from rolling over. For example, as schematically shown in FIG. 4B, the first and second steering assemblies 126A and 126B, the brakes 402A and 402B, and the motor(s) 406 may operate in a coordinated manner (e.g., concurrently or substantially simultaneously) in order to prevent the vehicle 100 from rolling over. For example, the brakes 402A and 402B may reduce the speed of the first wheels 106A and 106B to cause respective braking forces 410 on the first wheels 106A and 106B. The motor(s) 406 may provide a driving torque to the second wheels 106C and 106D to cause respective forward-acting forces 412 on the second wheels 106C and 106D. In combination with the action of the first and second steering assemblies 126A and 126B, this may result in reducing the lateral force 308 acting on the vehicle 100, thereby preventing the vehicle 100 from rolling over (or at least reducing the likelihood that the vehicle 100 will roll over).

Figure 5B:
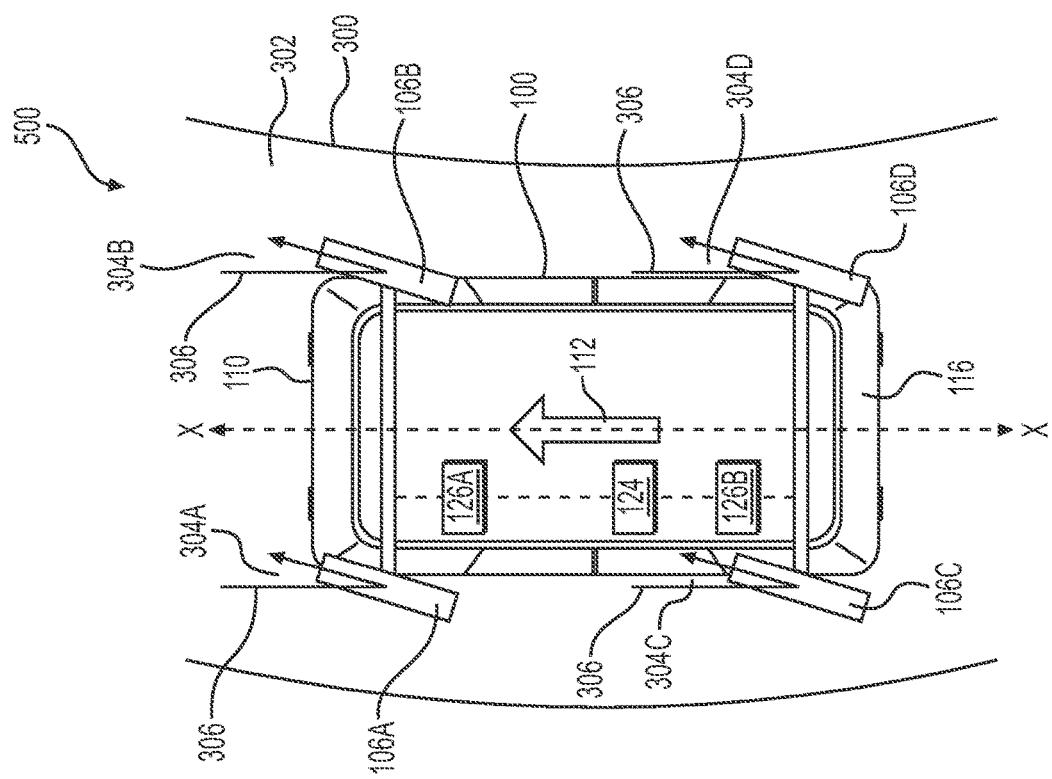
FIG. 5B is a schematic overhead view of an example vehicle maneuvering through an example curve according to an example second mode.
Figure 5A:
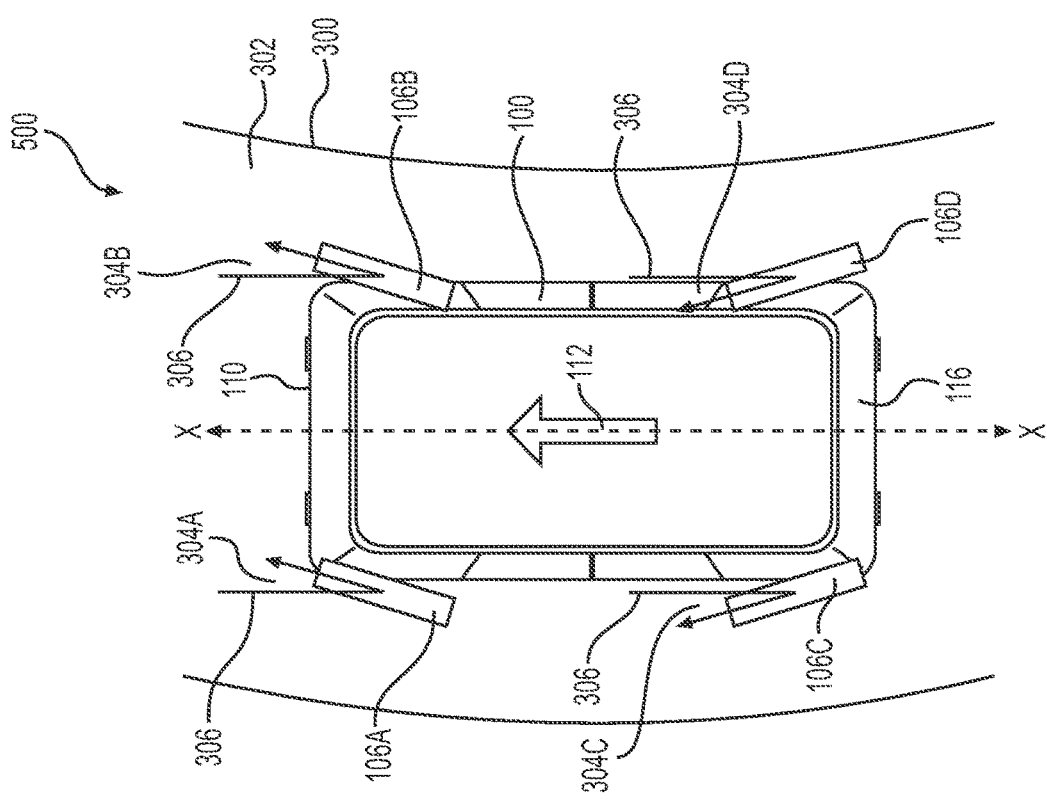
FIG. 5A is a schematic overhead view of an example vehicle maneuvering through an example curve according to an example first mode.

FIGS. 5A and 5B are schematic overhead views of example vehicles 100 maneuvering through example environments 500 that include curves 300 according to an example first mode of operation and an example second mode of operation, respectively. For example, the wheel control systems 122 associated with these example vehicles 100 shown in FIGS. 5A and 5B may be configured to facilitate control of the vehicles 100 according to different modes of operation based on parameters, such as, for example, the speed of the vehicle 100. In some examples, the wheel controller 124 may be configured to receive one or more signals indicative of the speed of the vehicle 100, and one or more signals indicative of initiating one or more of a lane change or a change in trajectory of the vehicle 100, for example, to travel through a curve. In such examples, the wheel controller 124 may be configured to control operation of the first steering assembly 126A and the second steering assembly 126B to control the steering angles 304A and 304B of the first wheels 106A and 106B, and the steering angles 304C and 304D of the second wheels 106C and 106D, respectively, based at least in part on the one or more signals indicative of the speed of the vehicle 100 and the one or more signals indicative of initiating a lane change or a change in direction.

The wheel controller 124 may be configured to control operation of the first steering assembly 126A and the second steering assembly 126B according to different operating modes based on, for example, one more signals indicative of the speed of the vehicle 100. For example, operating in a first mode may provide more maneuverability at relatively lower speeds, and operating in a second mode may provide greater cornering stability at relatively higher speeds. In some examples, the transition between the first mode and the second mode may be gradual and may be related to vehicle speed and/or other factors, such as, for example, steering angle and/or braking. In some such examples, any one or more of the angles may vary continuously with respect to speed. In some examples, the transition between the first and second modes may depend on a threshold speed, below which the vehicle operates according to the first mode, and above which the vehicle operates according to the second mode. In some examples, the transition from the second mode to the first mode may occur as the vehicle speed is reduced, for example, in a manner similar to the transition from the first mode to the second mode.

In the example shown in FIGS. 5A and 5B, the wheel controller 124 is configured to control operation of the first steering assembly 126A and the second steering assembly 126B according to a first mode when the one or more signals indicative of the speed of the vehicle indicate the speed of the vehicle 100 is less than or equal to a threshold speed. As shown in FIG. 5B, the wheel controller 124 may be configured to control operation of the first steering assembly 126A and the second steering assembly 126B according to a second mode when the one or more signals indicative of the speed of the vehicle indicate the speed of the vehicle 100 is greater than the threshold speed. For example, controlling the first steering assembly 126A and the second steering assembly 126B according to the first mode may include causing the first steering assembly 126A to pivot the first wheels 106A and 106B at first steering angles 304A and 304B in a first direction relative to the longitudinal axis X of the vehicle 100 (e.g., relative to the zero positions 306), and causing the second steering assembly 126B to pivot the second wheels 106C and 106D at second steering angles 304C and 304D in a second direction relative to the longitudinal axis X of the vehicle 100 (e.g., relative to the zero positions 306), such that the first direction and the second direction are different from one another. For example, the wheel controller 124 may cause the first steering assembly 126A to turn the first wheels 106A and 106B to the right, and the second steering assembly 126B to turn the second wheels 106C and 106D to the left, for example, as shown in FIG. 5A. This may provide more maneuverability at lower speeds, which may be desirable in, for example, a parking lot.

In some examples, controlling the first steering assembly 126A and the second steering assembly 126B according to the second mode may include causing the first steering assembly 126A to pivot the first wheels 106A and 106B at first steering angles 304A and 304B in a first direction relative to the longitudinal axis X of the vehicle 100 (e.g., relative to the zero positions 306), and causing the second steering assembly 126B to pivot the second wheels 106C and 106D at second steering angles 304C and 304D in the first direction relative to the longitudinal axis X of the vehicle 100 (e.g., relative to the zero positions 306), for example, as shown in FIG. 5B. For example, when maneuvering through a curve 300 that bends to the right, the wheel controller 124 may be configured to cause the first and second steering assemblies 126A and 126B to turn the first wheels 106A and 106B and the second wheels 106C and 106D toward the right, so that both the first end 110 and second end 116 of the vehicle 100 move toward the right and through the curve 300. Although the first wheels 106A and 106B and the second wheels 106C and 106D are turned in the same direction, the first steering angles 304A and 304B may differ from the second steering angles 304C and 304D. For example, the first steering angles 304A and 304B may be about 15 degrees to the right, and the second steering angles 304C and 304D may be about 10 degrees to the right. Other steering angles are contemplated. This example mode of operation may provide improved stability at higher speeds when maneuvering through a curve.

In some examples, a steering strategy may be selected, for example, to optimize stability for a vehicle during execution of a trajectory for the vehicle. For example, it may be based on factors such as center of gravity, speed, radius of curvature of the instantaneous section of road, moments of inertia, and the like, as would be appreciated. As a non-limiting example, the wheel controller 124 may continuously, and smoothly, vary operation between the first mode and the second mode with respect to speed.

Figure 6A:
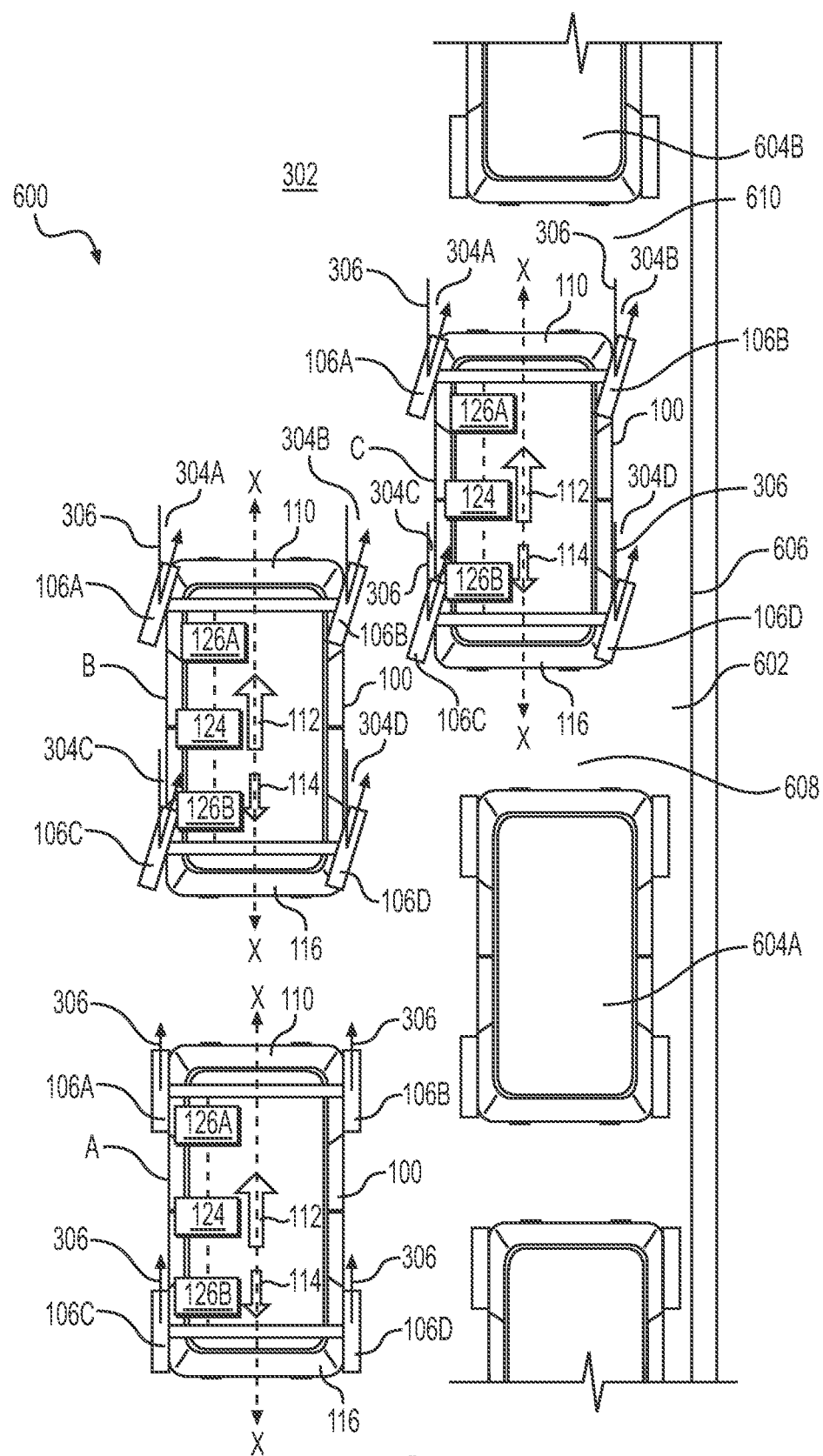
FIG. 6A is a schematic overhead view of an example vehicle maneuvering into an example parallel parking space according to an example first mode.
Figure 6B:
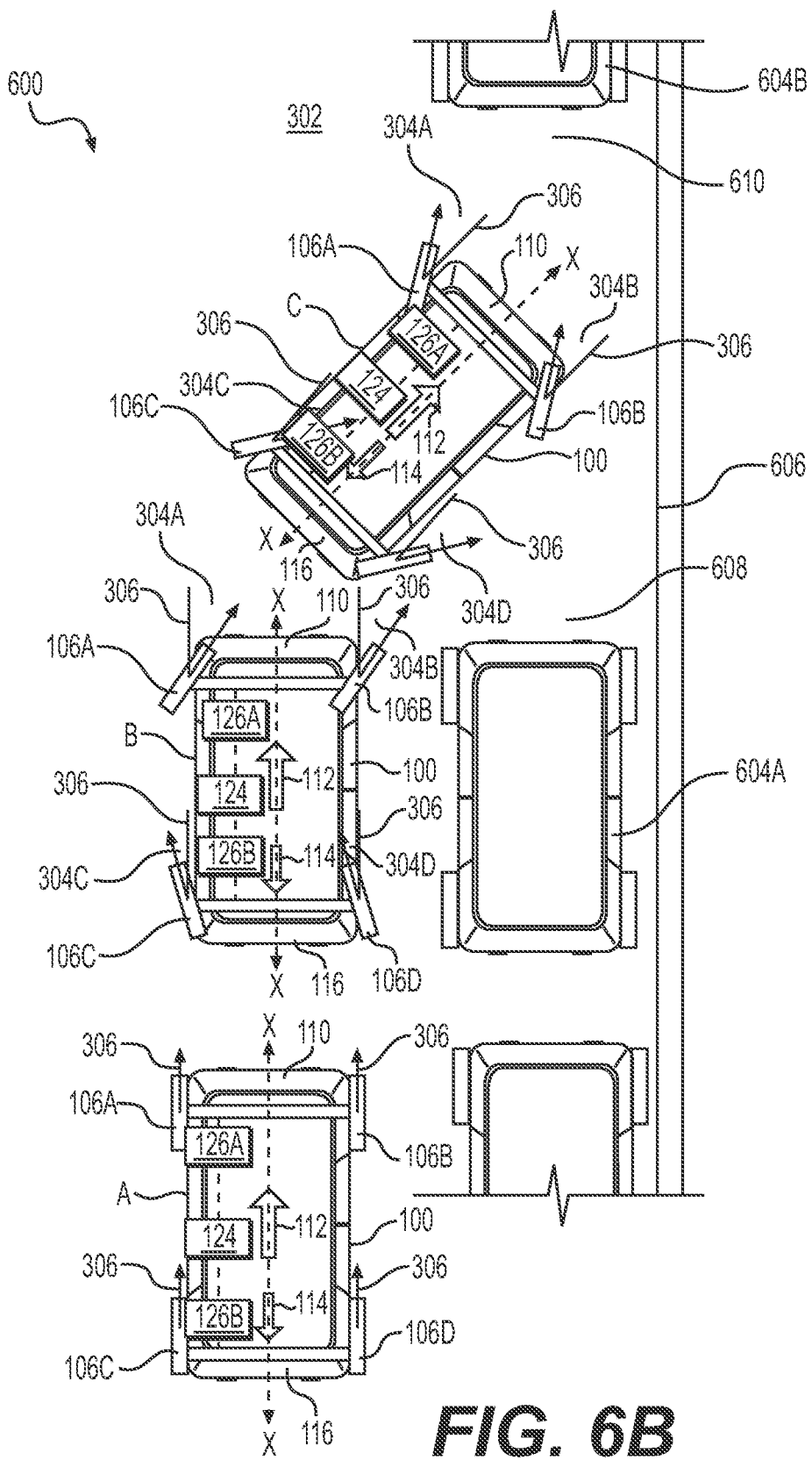
FIG. 6B is a schematic overhead view of an example vehicle maneuvering into an example parallel parking space according to an example second mode.

FIGS. 6A and 6B are schematic overhead views of example vehicles 100 in environments 600 maneuvering into example parallel parking spaces 602 according to an example first mode and an example second mode, respectively. For example, FIGS. 6A and 6B show example parallel parking spaces 602, for example, bordered at each of opposite ends by vehicles 604A and 604B, and a distal longitudinal border 606 of the parallel parking space 602 (e.g., an edge of the road 302) on which the vehicle 100 is traveling. In some examples, the wheel controller 124 may be configured to receive a signal indicative of initiating parallel parking into a parallel parking space 602, such as those shown in FIGS. 6A and 6B. For example, the wheel controller 124 may control operation of the first steering assembly 126A and the second steering assembly 126B to control the steering angles 304A and 304B of the first wheels 106A and 106B, and the steering angles 304C and 304D of the second wheels 106C and 106D, respectively, based at least in part on the one or more signals indicative of initiating parallel parking. In some examples, when the vehicle 100 is traveling in a first travel direction 112, such that the first end 110 of the vehicle 100 is the front end of the vehicle 100, the wheel controller 124 may be configured to control operation of the first steering assembly 126A and the second steering assembly 126B to cause the vehicle 100 to park in the parallel parking space 602 without the vehicle 100 traveling in a second travel direction 114 opposite the first travel direction 112. Although the vehicle 100 may be sufficiently close to the longitudinal border 606 to be considered properly parked, it is contemplated that the vehicle 100 may be maneuvered in the second travel direction 114 to park closer to the longitudinal border 606 and/or to provide additional room for one or more of the other vehicles 604A and 604B to exit their respective parking spaces.

In the example first mode shown in FIG. 6A, at position A, the vehicle 100 pulls forward in the first travel direction 112, alongside the vehicle 604A bordering a proximate end 608 of the parallel parking space 602 with the first wheels 106A and 106B and the second wheels 106C and 106D in the zero positions 306. As the vehicle 100 continues to pull forward in the first travel direction 112, the vehicle sensors 204 (see FIG. 2) may generate sensor signals indicative of the end of the vehicle 604A bordering the proximate end 608 of the parallel parking space 602, the end of the other vehicle 604B bordering the distal end 610 of the parallel parking space 602, and the longitudinal border 606. As the vehicle 100 moves into position B shown in FIG. 6A, in the example first mode of operation, the wheel controller 124 is configured to control operation of the first steering assembly 126A to provide steering angles 304A and 304B of the first wheels 106A and 106B that point the first wheels 106A and 106B toward the longitudinal border 606 and into the parallel parking space 602, while controlling operation of the second steering assembly 126B to provide steering angles 304C and 304D of the second wheels 106C and 106D that point the second wheels 106C and 106D toward the longitudinal border 606 and into the parallel parking space 602. In some examples, the wheel controller 124 may cause the steering assemblies 126A and 126B to adjust one or more of the steering angles 304A-304D as the vehicle 100 pulls into the parallel parking space 602 and toward the longitudinal border 606 to position C shown in FIG. 6A based on, for example, one or more signals received from the planner 214 and/or one or more signals received from the vehicle sensors 204 (see FIG. 2). In this example manner, the wheel control system 122 may operate to maneuver the vehicle 100 into the parking space 602 and into position C without changing directions from the first travel direction 112 to the opposite, second travel direction 114. Though not illustrated in the drawings, a similar procedure may be employed for navigating the vehicle 100 out of the parking space 602.

FIG. 6B shows an example second mode for parking the vehicle 100 in the parallel parking space 602. In the example shown, at position A, the vehicle 100 pulls forward in the first travel direction 112, alongside the vehicle 604A bordering a proximate end 608 of the parallel parking space 602 with the first wheels 106A and 106B and the second wheels 106C and 106D in the zero positions 306. As the vehicle 100 continues to pull forward in the first travel direction 112 to position B, where the first end 110 of the vehicle 100 is generally even with the end of the vehicle 604A bordering the proximate end 608 of the parallel parking space 602, the vehicle sensors 204 may generate sensor signals indicative of the end of the vehicle 604A bordering the proximate end 608 of the parallel parking space 602, the end of the other vehicle 604B bordering the distal end 610 of the parking space 602, and the longitudinal border 606. As the vehicle 100 moves into position B shown in FIG. 6B, in the example second mode of operation, the wheel controller 124 is configured to control operation of the first steering assembly 126A to provide steering angles 304A and 304B of the first wheels 106A and 106B that point the first wheels toward the longitudinal border 606 and into the parallel parking space 602, while controlling operation of the second steering assembly 126B to provide steering angles 304C and 304D of the second wheels 106C and 106D that point the second wheels 106C and 106D away from the parallel parking space 602, for example, as shown. This causes the second end 116 of the vehicle 100 to pivot outward relative to the other vehicle 604A, so that as the vehicle 100 pulls forward farther into the parallel parking space 602, the second end 116 of the vehicle 100 clears the other vehicle 604A, for example, as the vehicle 100 moves from position A to position B. Thereafter, the wheel controller 124 causes the first steering assembly 126A to pivot the first wheels 106A and 106B, so that they are pointed toward the vehicle 604B at the distal end 610 of the parking space 602. The wheel controller 124 also causes the second steering assembly 126B to pivot the second wheels 106C and 106D, so that they are at steering angles 304C and 304D that cause the second wheels 106C and 106D to be pointing toward the longitudinal border 606, for example, when the vehicle 100 is at position C in FIG. 6B. Thereafter, the wheel controller 124, according to the example second mode, causes the second steering assembly 126B to pivot the second wheels 106C and 106D toward the other vehicle 604B at the distal end 610 of the parallel parking space 602 as the vehicle 100 continues to pull forward in the first travel direction 112 and into the parallel parking space 602. As above, it will be appreciated that a similar procedure may be used to navigate the vehicle 100 out of the parking space 602.

Figure 7A:
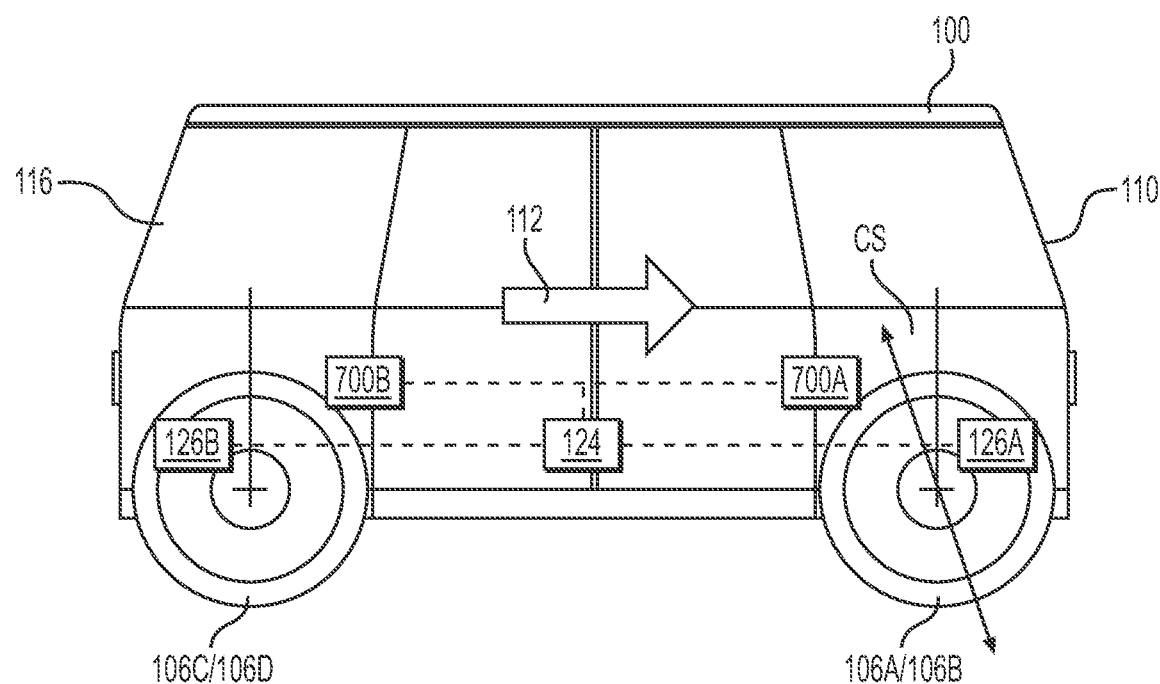
FIG. 7A is a schematic side view of an example vehicle including an example caster angle at the front end of the vehicle when the vehicle is operated in a first direction.
Figure 7B:
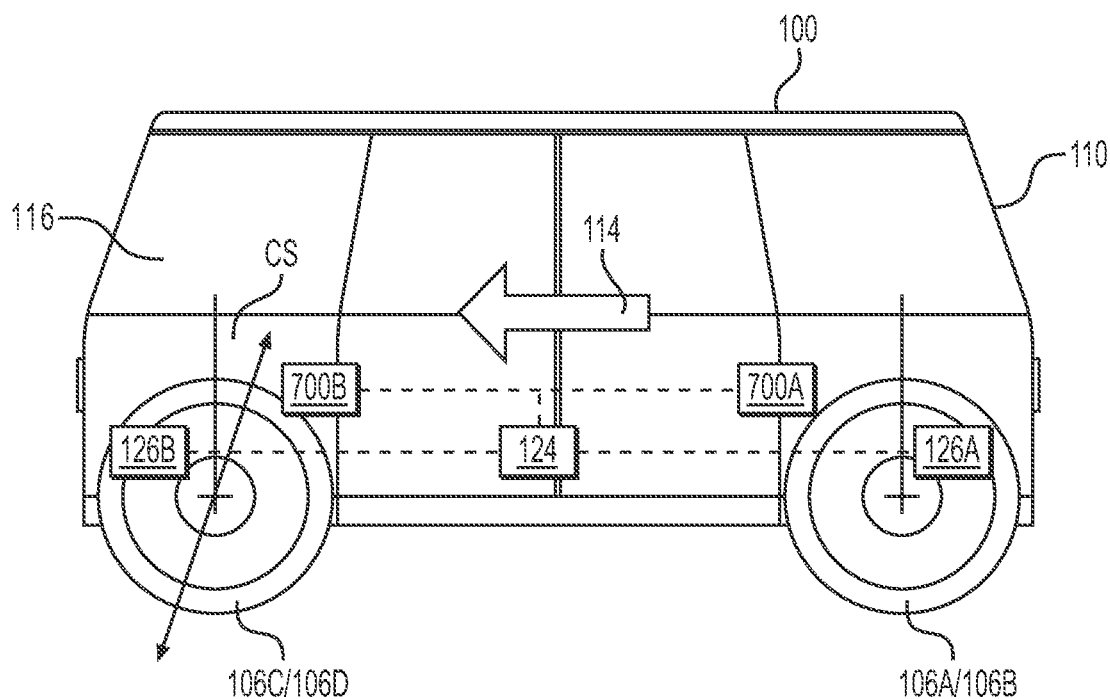
FIG. 7B is a schematic side view of an example vehicle including an example caster angle at the front end of the vehicle when the vehicle is operated in a second direction opposite the first direction.

FIGS. 7A and 7B are schematic side views of an example vehicle 100 including example caster angles CS. In some examples, the vehicle 100 is a bi-directional vehicle, for example, such as the bi-directional vehicle described previously herein. In the example shown in FIGS. 7A and 7B, the wheel control system 122 includes first and second steering assemblies 126A and 126B coupled proximate to the first end 110 and the second end 116 of the vehicle 100, respectively. The wheel control system 122 also includes a first caster adjustment assembly 700A coupled to the first steering assembly 126A (directly or indirectly) and/or a second caster adjustment assembly 700B coupled the second steering assembly 126B (directly or indirectly). In some examples, the caster adjustment assemblies 700A and 700B may be configured to change caster angles CS of the first wheels 106A and 106B and/or the second wheels 106C and 106D, respectively. For example, the wheel controller 124 may be configured to receive one or more signals indicative of the direction of travel of the vehicle 100, and cause the caster adjustment assembly 700A to change the caster angles CS of the first wheels 106A and 106B and/or the caster adjustment assembly 700B to change the caster angles CS of the second wheels 106C and 106D based at least in part on the one or more signals indicative of the direction of travel of the vehicle. For example, when the vehicle 100 is traveling in the first travel direction 112 (see FIG. 7A), such that the first end 110 of the vehicle 100 is the front end of the vehicle 100, the wheel controller 124 may be configured to control operation of the first caster adjustment assembly 700A to cause the first wheels 106A and 106B to have positive caster angles CS, for example, as shown in FIG. 7A. Alternatively, or in addition, when the vehicle 100 is traveling in the second travel direction 114 (see FIG. 7B), such that the second end 116 of the vehicle 100 is the front end of the vehicle 100, the wheel controller 124 may be configured to control operation of the second caster adjustment assembly 700B to cause the second wheels 106C and 106D to have positive caster angles CS, for example, as shown in FIG. 7B.

In some examples, the wheel controller 124 may be configured to control operation of caster adjustment assemblies at both ends of the vehicle 100, for example, to improve the handling of the vehicle 100. For example, providing or increasing the amount of positive caster angle at the front end of the vehicle 100 may improve the on-center stability of the front end of the vehicle 100. However, the caster adjustment assembly 700 may be used to either reduce or eliminate the amount of positive caster angle at the rear end of the vehicle 100, for example, to provide a desired level of responsiveness of the rear end of the vehicle 100.

Figure 8A:
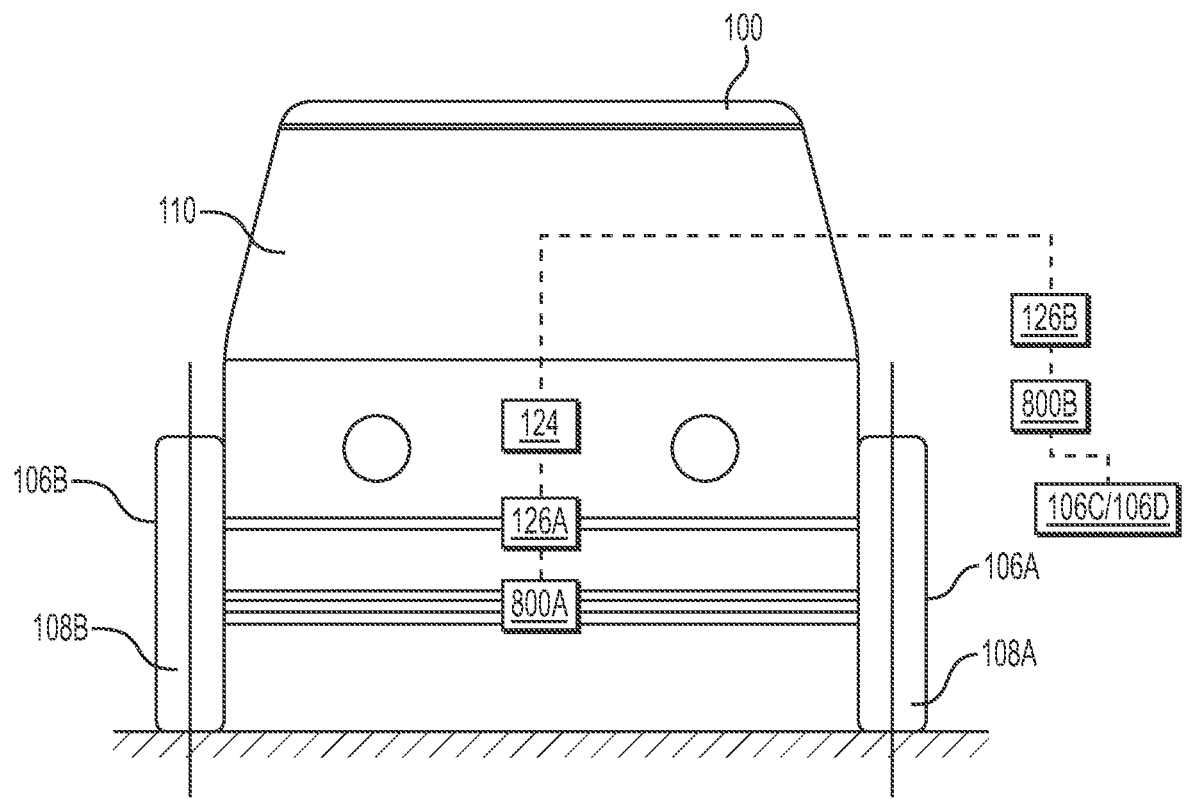
FIG. 8A is a schematic front view of an example vehicle having wheels at a neutral camber angle.
Figure 8B:
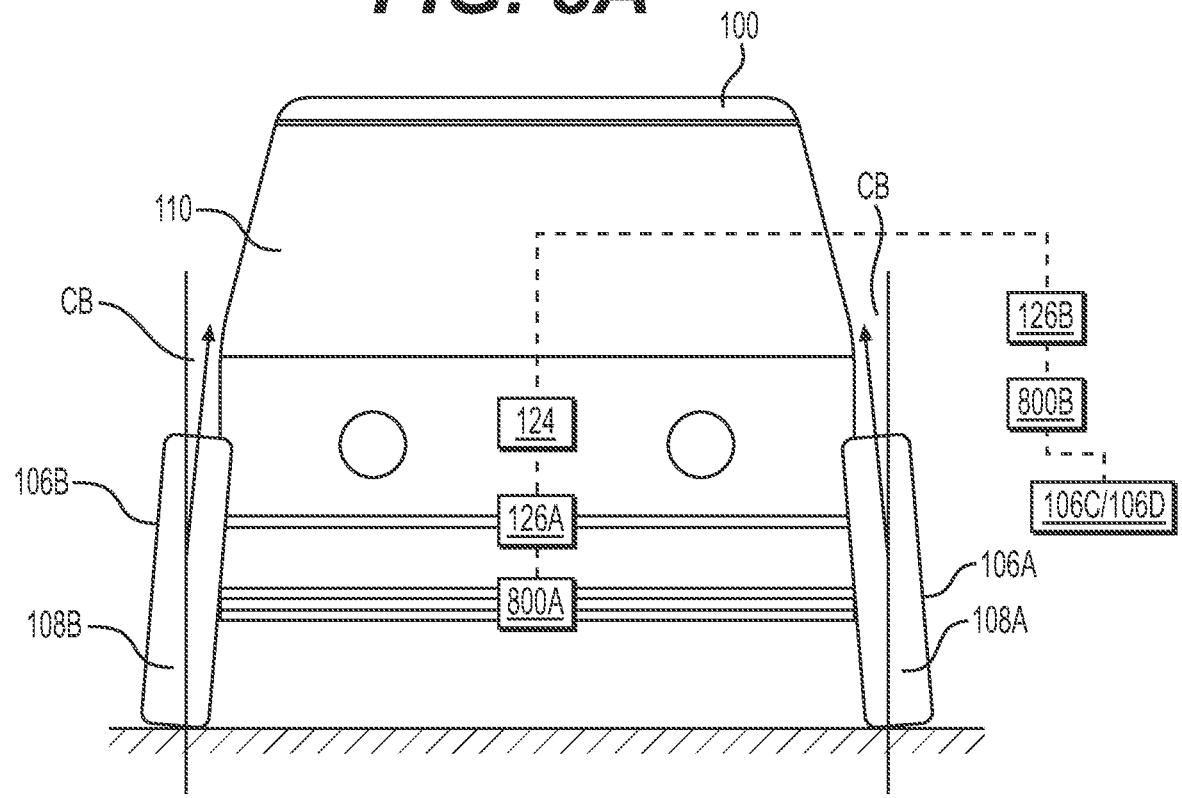
FIG. 8B is a schematic front view of an example vehicle having wheels at a negative camber angle.

FIGS. 8A and 8B are schematic front views of an example vehicle 100 having first wheels 106A and 106B and/or second wheels 106C and 106D at a neutral (or zero) camber angles CB (FIG. 8A) and negative camber angles CB (FIG. 8B). The wheel control system 122 may include a first camber adjustment assembly 800A coupled to the first steering assembly 126A (directly or indirectly), and/or a second camber angle adjustment assembly 800B coupled to the second steering assembly 126B (directly or indirectly). In some examples, the camber adjustment assemblies 800A and 800B may be configured to change camber angles CB of the first wheels 106A and 106B and/or the second wheels 106C and 106D, respectively. For example, the wheel controller 124 may be configured to receive one or more signals indicative of the direction of travel of the vehicle 100, and cause the first camber adjustment assembly 800A to change the camber angles CB of the first wheels 106A and 106B and/or cause the second camber angle adjustment assembly 800B to change the camber angles of the second wheels 106C and 106D, based at least in part on the one or more signals indicative of the direction of travel of the vehicle 100. For example, when the vehicle 100 is traveling in a first travel direction 112, such that the first end 110 of the vehicle 100 is the front end of the vehicle 100, the wheel controller 124 may be configured to control operation of the first camber adjustment assembly 800A to cause the first wheels 106A and 106B to have negative camber angles CB, for example, as shown in FIG. 8B. In some examples, the wheel controller 124 may be configured to receive one or more signals indicative of initiating turning of the vehicle 100, and control operation of the first camber adjustment assembly 800A to cause the first wheels 106A and 106B to increase amounts of respective negative camber angles CB based at least in part on the one or more signals indicative of initiating turning of the vehicle 100, and/or control operation of the second camber adjustment assembly 800B to cause the second wheels 106C and 106D to increase amounts of respective negative camber angles CB based at least in part on the one or more signals indicative of initiating turning of the vehicle 100. In some examples, camber angles of the wheels may also be adjusted based on knowledge of the driving surface as may be made available from map data. In some examples, the camber adjustment assemblies 800A and 800B may be configured to change the camber angle(s) CB of one or more of the wheels 106A-106D independently from the other wheels. Increasing the negative camber angle may improve the road holding and/or handling of the vehicle 100, particularly when the vehicle 100 is traveling through a curve 300 in the road 302 because the contract patches between the road 302 and the tires 108 on the side of the vehicle 100 that are on the outside of the curve 300 may be larger when the wheels 106 have a negative camber angle.

Figure 9A:
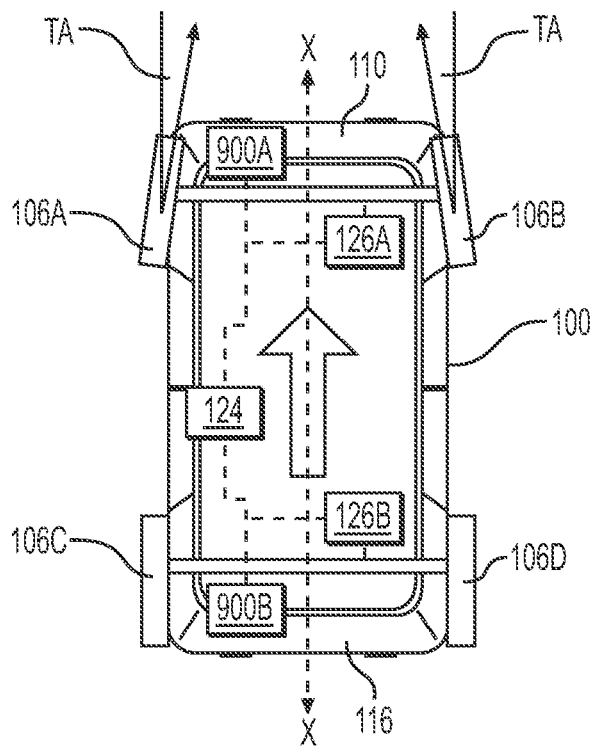
Figure 9B:
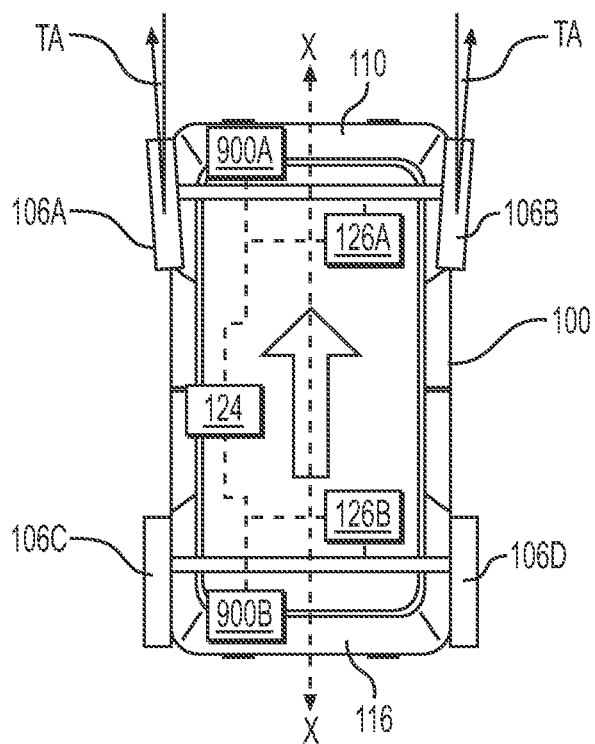
FIG. 9B is a schematic overhead view of an example vehicle having front wheels with toe-out.

FIGS. 9A and 9B are schematic overhead views of an example vehicle 100 having front wheels with toe-in and toe-out, respectively. The wheel control system 122 may include a first toe adjustment assembly 900A coupled to the first steering assembly 126A (directly or indirectly), and/or a second toe adjustment assembly 900B coupled to the second steering assembly 126B (directly or indirectly). In some examples, the first toe adjustment assembly 900A may be configured to change toe angles TA of the first wheels 106A and 106B, and/or the second toe adjustment assembly 900B may be configured to change toe angles TA of the second wheels 106C and 106D. For example, the wheel controller 124 may be configured to receive one or more signals indicative of one or more of the speed of the vehicle 100 and/or initiating a turn of the vehicle 100, and cause the toe adjustment assemblies 900A and/or 900B to change the toe angles TA of the first wheels 106A and 106B and/or the second wheels 106C and 106D based at least in part on the one or more signals. For example, the wheel controller 124 may be configured to control operation of the toe adjustment assemblies 900A and/or 900B to change the toe angle(s) TA, such that an amount of toe-in of one or more of the wheels 106A-106D is reduced upon receipt of the one or more signals indicative of initiating a turn for the vehicle 100. For example, the first toe adjustment assembly 900A may change the toe angles TA of one or more of the first wheels 106A and 106B, from having toe-in (see FIG. 9A) to instead have toe-out (see FIG. 9B). In some examples, the wheel controller 124 may be configured to control operation of the toe adjustment assemblies 900A and/or 900B based at least in part on the one or more signals indicative of speed, such that an amount of toe-in of the first wheels 106A and/or 106B (and/or the second wheels 106C and/or 106D) is increased when the one or more signals indicative of speed indicates a vehicle speed greater than a threshold speed. Increasing the amount of toe-in may result in the vehicle 100 having greater stability when traveling in a straight line, for example, at greater speeds. Decreasing the amount of toe-in (e.g., such that the toe angle TA results in slight toe-out (see FIG. 9B)) may increase the responsiveness of the vehicle 100 when turning. Thus, the wheel controller 124 may control operation of the toe adjustment assembly 900 to tailor the handling of the vehicle 100 based at least in part on the speed of the vehicle 100 and/or whether the vehicle 100 of traveling through a curve. It should be appreciated that any various combinations of castor, camber, and toe may be selected for each wheel to optimize performance of the vehicle 100.

Figure 10A:
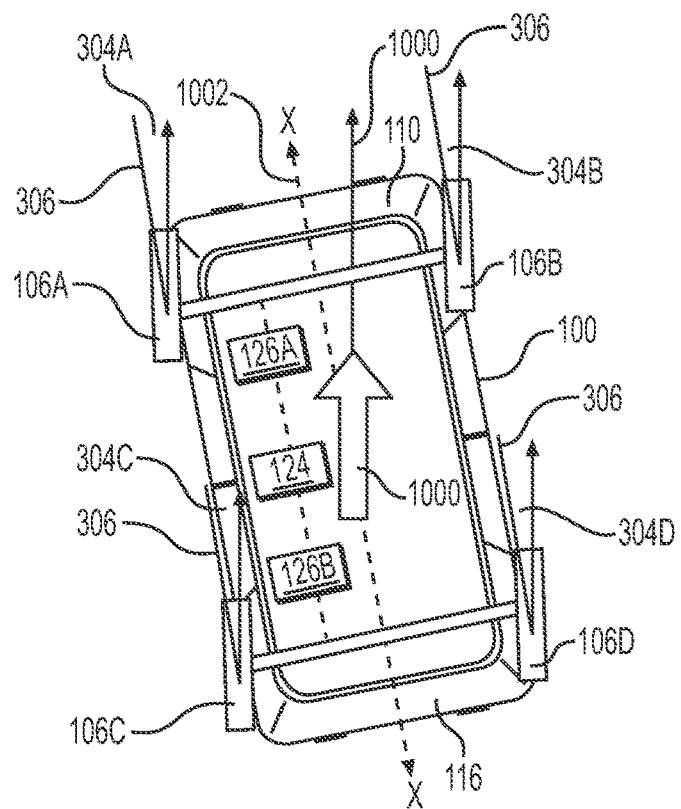
FIG. 10A is a schematic overhead view of an example vehicle maneuvering with a direction of travel that is misaligned with the longitudinal axis of the vehicle.
Figure 10B:
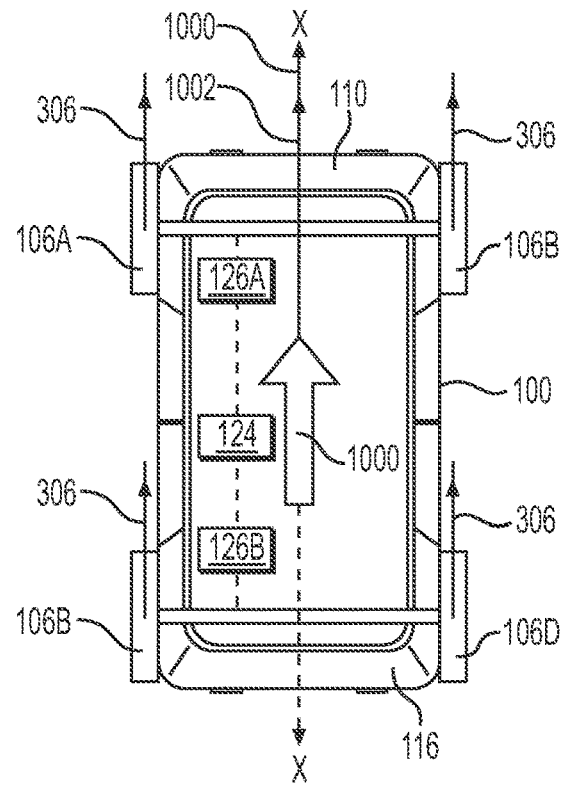
FIG. 10B is a schematic overhead view of an example vehicle maneuvering with a direction of travel that is aligned with the longitudinal axis of the vehicle.

FIG. 10A is schematic overhead view of an example vehicle 100 maneuvering with a direction of travel 1000 that is misaligned with the longitudinal axis X of the vehicle 100, and FIG. 10B is a schematic overhead view of the example vehicle 100 maneuvering with a direction of travel 1000 that is aligned with the longitudinal axis X of the vehicle 100. In some examples of the wheel control system 122, the wheel controller 124 may be configured to receive one or more signals indicative of the direction of travel 1000 of the vehicle 100 and one or more signals indicative of a direction 1002 defined by the longitudinal axis X of the vehicle 100. In such examples, the wheel controller 124 may be configured to determine, based at least in part on the one or more signals indicative of a direction of travel 1000 and the one or more signals indicative of the direction 1002 defined by the longitudinal axis X, misalignment between the direction of travel 1000 and the direction 1002 defined by the longitudinal axis X The wheel controller 124, in some examples, may be configured to control the first steering assembly 126A and the second steering assembly 126B to reduce or eliminate the misalignment between the direction of travel 1000 and the direction 1002. In some examples, the longitudinal axis X of the vehicle 100 may be aligned with (or contained in) a plane passing through the centerline of the vehicle 100.

In some examples, the vehicle 100 may include active suspension, for example, configured to be actively and dynamically adjustable at one or more of the wheels 106A-106D of the vehicle 100 based on, for example, the state of the vehicle 100 (e.g., based on vehicle speed, whether the vehicle 100 is accelerating, braking, and/or turning, and/or the relative smoothness of the surface of the road). In some such examples, the wheel controller 124 may be configured to detect misalignment, for example, when the active suspension is adjusted at one or more of the four wheels 106A-106D and by detecting differences in the response(s) to the adjustment(s) at the different wheels 106A-106D.

In some examples, the first steering assembly 126A may include a first steering rack configured to be coupled to each of the first wheels 106A and 106B and control orientation of the first wheels 106A and 106B relative to the longitudinal axis X of the vehicle 100. The second steering assembly 126B may include a second steering rack configured to be coupled to each of the second wheels 106C and 106D and control orientation of the second wheels 106C and 106D relative to the longitudinal axis X. In some such systems, the wheel controller 124 may be configured to control operation of the first steering rack and the second steering rack to align the first wheels 106A and 106B and the second wheels 106C and 106D with the longitudinal axis X of the vehicle 100. For example, one or more of the first steering rack or the second steering rack may define respective zero positions intended to align the associated first wheels 106A and 106B and second wheels 106C and 106D with the longitudinal axis X of the vehicle 100. In some examples, the wheel controller 124 may be configured to adjust the zero positions of one or more of the first steering rack or the second steering rack, so that each of the first wheels 106A and 106B and each of the second wheels 106C and 106D is aligned with the longitudinal axis X of the vehicle, for example, within technical tolerances In some examples, the wheel control system 122 may include, or be in communication with, the location systems 210 (see FIG. 2), which may, for example, include a global positioning system, and the one or more signals indicative of the direction of travel 1000 of the vehicle 100 may be based at least in part on one or more signals generated by the global positioning system. In some examples, the wheel control system 122 may be in communication with one or more of the vehicle sensors 204 (see FIG. 2), which may include a sensor configured to generate one or more signals indicative of the direction 1002 defined by the longitudinal axis X of the vehicle 100. In some examples, the wheel controller 124 may be configured to control the first steering assembly 126A to change the first steering angles 304A and/or 304B of the first wheels 106A and/or 106B in a first direction, and control the second steering assembly 126B to change the second steering angles 304C and/or 304D of the second wheels 106C and/or 106D in a direction consistent with the first direction. For example, the first and second steering angles 304A-304D may be substantially the same. In some examples, the resulting steering angles 304A-304D may be zero, for example, such that each of the wheels 106A-106D is aligned with the zero position 306, for example, as shown in FIG. 10B. In some examples, the resulting steering angles 304A-304D may not necessarily be zero, and the wheels 106A-106D may not necessarily be aligned with the zero position 306. In this example manner, the wheel control system 122 may be used to align the direction of travel 1000 of the vehicle 100 and the direction 1002 defined by the longitudinal axis X of the vehicle 100.

Figure 11A:
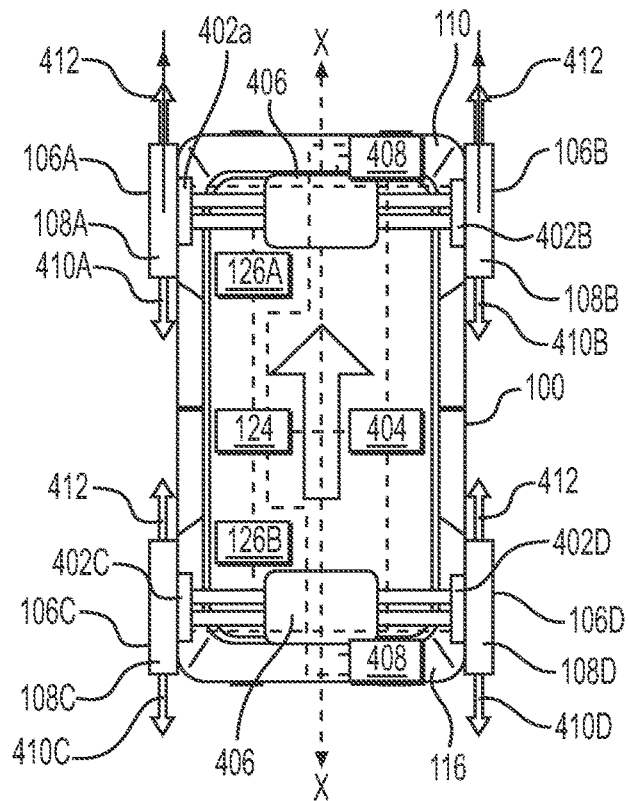
FIG. 11A is a schematic overhead view of an example vehicle performing an example method for estimating tire-surface parameterization data associated with the surface on which the vehicle is traveling.
Figure 11B:
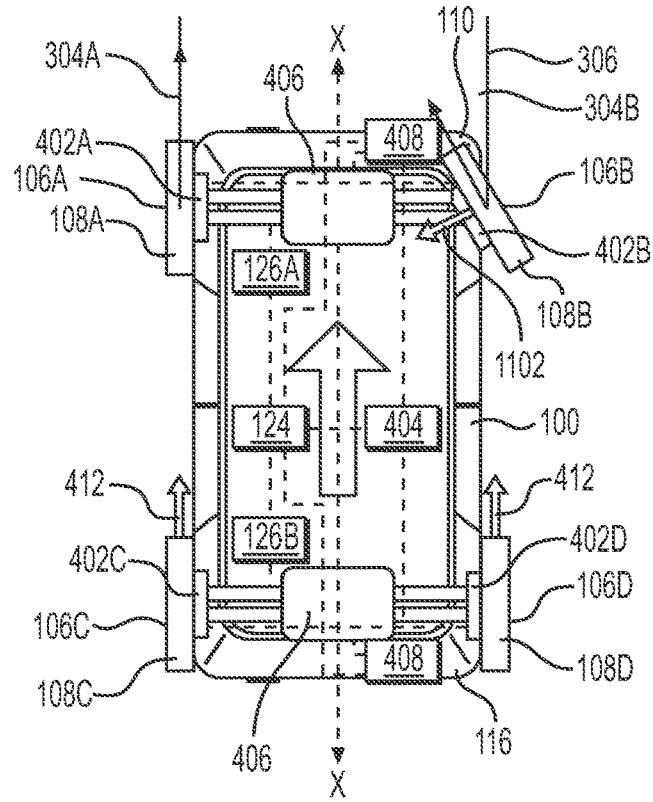
FIG. 11B is a schematic overhead view of an example vehicle performing another example method for estimating tire-surface parameterization data associated with the surface on which the vehicle is traveling.

FIG. 11A is a schematic overhead view of an example vehicle 100 including an example system for estimating tire-surface parameterization data 134 (see FIGS. 1 and 2) associated with a surface on which the vehicle 100 is traveling, and FIG. 11B is a schematic overhead view of the example vehicle 100 including an example of a system for estimating tire-surface parameterization data 134 associated with a surface on which the vehicle 100 is traveling according to another method. For example, as shown in FIG. 11A, some examples of the system for estimating tire-surface parameterization data 134 may incorporate one or more of the wheel control system 122, the braking system 130 including brakes 402A and 402B configured to be coupled to the respective first wheels 106A and 106B, and brakes 402C and 402D configured to be coupled to the respective second wheels 106C and 106D. For example, the braking system 130 may also include a braking controller 404 configured to control operation of each of the brakes 402A-402D. In some examples, the braking controller 404 may be configured to control activation of one or more of the brakes 402A-402D independently of one another. In some examples, the braking controller 404 may be configured to activate one or more of the brakes 402A and 402B to cause rotation of one or more the first wheels 106A or 106B to slow or stop, and/or to activate one or more of the brakes 402C and 402D to cause rotation of one or more the second wheels 106C or 106D to slow or stop. Some examples of the vehicle 100 may also include an acceleration system 132. The acceleration system 132 may include one or more motors 406 coupled to the first wheels 106A and 106B and/or one or more motors 406 coupled to the second wheels 106C and 106D, and a motor controller 408 configured to cause the motor(s) 406 to supply torque to one or more of the first wheels 106A and 106B and/or one or more of the second wheels 106C or 106D.

In some examples, the wheel control system 122 may be configured to activate one of the brakes 402A, 402B, 402C, or 402D to cause rotation of one of the tires 108A, 108B, 108C, or 108D to slow, and cause the one or more motors 406 to supply torque to another one or more of the tires 108A, 108B, 108C, or 108D to resist slowing of the vehicle 100 caused by activation of the brake 402A, 402B, 402C, or 402D. For example, the wheel control system 122 may be configured to activate the brake 402B to cause rotation of the associated tire 108B to slow, and cause the one or more motors 406 to supply torque to another one or more of the tires 108A, 108C, or 108D to provide forward-acting forces 412 to resist slowing of the vehicle 100 caused by activation of the brake 402B. In such an example, appropriate combinations of braking and torque may be provided so as not to incur any yaw of the vehicle. The wheel control system 122 may also include a tire-surface parameterization estimator 136 (see FIGS. 1 and 2) configured to receive one or more signals indicative of the speed of rotation of the tire 108B during the braking, and receive one or more signals indicative of the braking force 410B on the tire 108B during the braking. Based at least in part on one or more of the signals indicative of the speed of rotation of the tire 108B and/or indicative of the braking force on the tire 108B, the tire-surface parameterization estimator 136 may be configured to estimate tire-surface parameterization data associated with the surface. In some examples, the tire-surface parameterization data may include a friction coefficient (e.g., a static or a dynamic friction coefficient) between the surface and one or more tires 108 of the vehicle 100. In some examples, the brakes 402 may include one or more brakes that are part of a regenerative braking system.

In some examples of the system for estimating tire-surface parameterization data 134, the first tires 108A and 108B may be coupled proximate to a first end 110 of the vehicle 100 (e.g., via the wheels 106A and 106B, respectively, and suspension), and the second tires 108C and 108D may be coupled proximate to a second end 116 of the vehicle 100 (e.g., via a wheels 106C and 106D, respectively, and suspension). In some examples, the wheel control system 122 may be configured to activate one of the second brakes 402C and 402D to cause rotation of one of the respective second tires 108C and 108D to slow or stop, cause the motor(s) 406 coupled to the first wheels 106A and 106B to supply torque to one or more of the first tires 108A and 108B to provide forward-acting forces 412 to resist slowing of the vehicle 100 caused by activation of the second brake 402C or 402D. The tire-surface parameterization estimator 136 may be configured to receive one or more signals indicative of the speed of rotation of the second tire 108C or 108D during braking, and receive one or more signals indicative of a braking force 410C or 410D on the second tire 108C or 108D during the braking. The tire-surface parameterization estimator 136 may be configured to estimate tire-surface parameterization data associated with the surface based at least in part on the one or more signals indicative of the speed of rotation of the second tire 108C or 108D and the one or more signals indicative of the braking force 410C or 410D. Some examples of the system for estimating tire-surface parameterization data may also include a reporting module 138 (see FIGS. 1 and 2) in communication with a communication network. The reporting module 138 may be configured to receive one or more signals from the location systems 210 (see FIG. 2) and communicate data correlating the location of the vehicle 100 and the tire-surface parameterization data via the communication network.

In some examples, the tire-surface parameterization data 134 may be communicated to, for example, the vehicle controller 228, which may cause one or more of the vehicle systems 102 to operate based at least in part on the tire-surface parameterization data 134. For example, the performance envelopes of one or more of acceleration, braking, and/or steering may be modified based at least in part on the tire-surface parameterization data 134, for example, to reduce the acceleration rates, braking rates, and/or steering rates in relatively lower friction situations, or raise the acceleration rates, braking rates, and/or steering rates in relatively higher friction situations. In some examples, suspension compliance and/or tire pressures may be adjusted based at least in part on the tire-surface parameterization-related data.

As shown in FIG. 11B, some examples of the system for estimating tire-surface parameterization data 134 may incorporate the steering assembly 126A or 126B, which may, in some examples, independently control the first steering angle 304A of the first tire 108A, and the second steering angle 304B of the second tire 108B. In some examples, the steering assembly 126A may be configured to change the second steering angle 304B without changing the first steering angle 304A, and/or change the first steering angle 304A without changing the second steering angle 304B. For example, the system for estimating tire-surface parameterization data 134 may also incorporate the wheel controller 124, and cause the second steering angle 304B and the first steering angle 304A to differ from one another. For example, as shown in FIG. 11B, the steering assembly 126A may be configured to control the second steering angle 304B, so that the second tire 108B is at a second steering angle 304B, while the first tire 108A is at a first steering angle 304A that differs from the second steering angle 304B. Though depicted in FIG. 11B for illustrative purposes, it should be appreciated that a caster angle, camber angle, and/or toe angle of any wheel 106 may be adjusted instead of, or in addition to, a steering angle 304, so as to impose a force on one or more of the wheels 106. In some examples, changes to any of the one or more wheels 106 for measuring friction should not impact a direction of travel, speed, or acceleration of the vehicle 100. The tire-surface parameterization estimator 136 may be configured to receive one or more signals indicative of a lateral force 1102 acting on the second tire 108B and estimate tire-surface parameterization data associated with the surface based at least in part on the one or more signals indicative of the lateral force 1102 acting on the second tire 108B. Such a force may be calculated, for example, by measuring, or otherwise determining, an additional amount of torque to apply to maintain a trajectory and speed, a reduction in speed, a deviation from an expected trajectory, a steering angle to maintain an expected trajectory, or the like.

In some examples, the steering assembly 126A may include a steering actuator coupled to one or more of the first tire 108A or the second tire 108B, and the one or more signals indicative of the lateral force 1102 acting on the first tire 108A or the second tire 108B may be based at least in part on one or more signals indicative of a force acting on the steering actuator. Some examples of the system for estimating tire-surface parameterization data 134 may include a sensor coupled to the steering assembly and configured to generate the one or more signals indicative of a lateral force 1102 on the first tire 108A or the second tire 108B. Some examples of the system for estimating tire-surface parameterization data 134 may incorporate one or more of the motors 406, and the one or more signals indicative of the lateral force 1102 acting on the first tire 108A or the second tire 108B may be based at least in part on one or more signals indicative of a change in torque supplied by the motor(s) 406 to maintain a speed of the vehicle 100 when the steering assembly 126A changes the steering angle 304A or 304B of the first tire 108A or the second tire 108B.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architecture 200 is merely illustrative and is not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all the software components may execute in memory on another device and communicate with the illustrated architecture 200. Some or all the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architecture 200 may be transmitted to the architecture 200 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 100 is discussed below. It should be appreciated that any examples described herein may be performed in sequence, substantially simultaneously, and repeatedly, and/or in no particular order.

FIGS. 12-15 are flow diagrams of example processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 12:
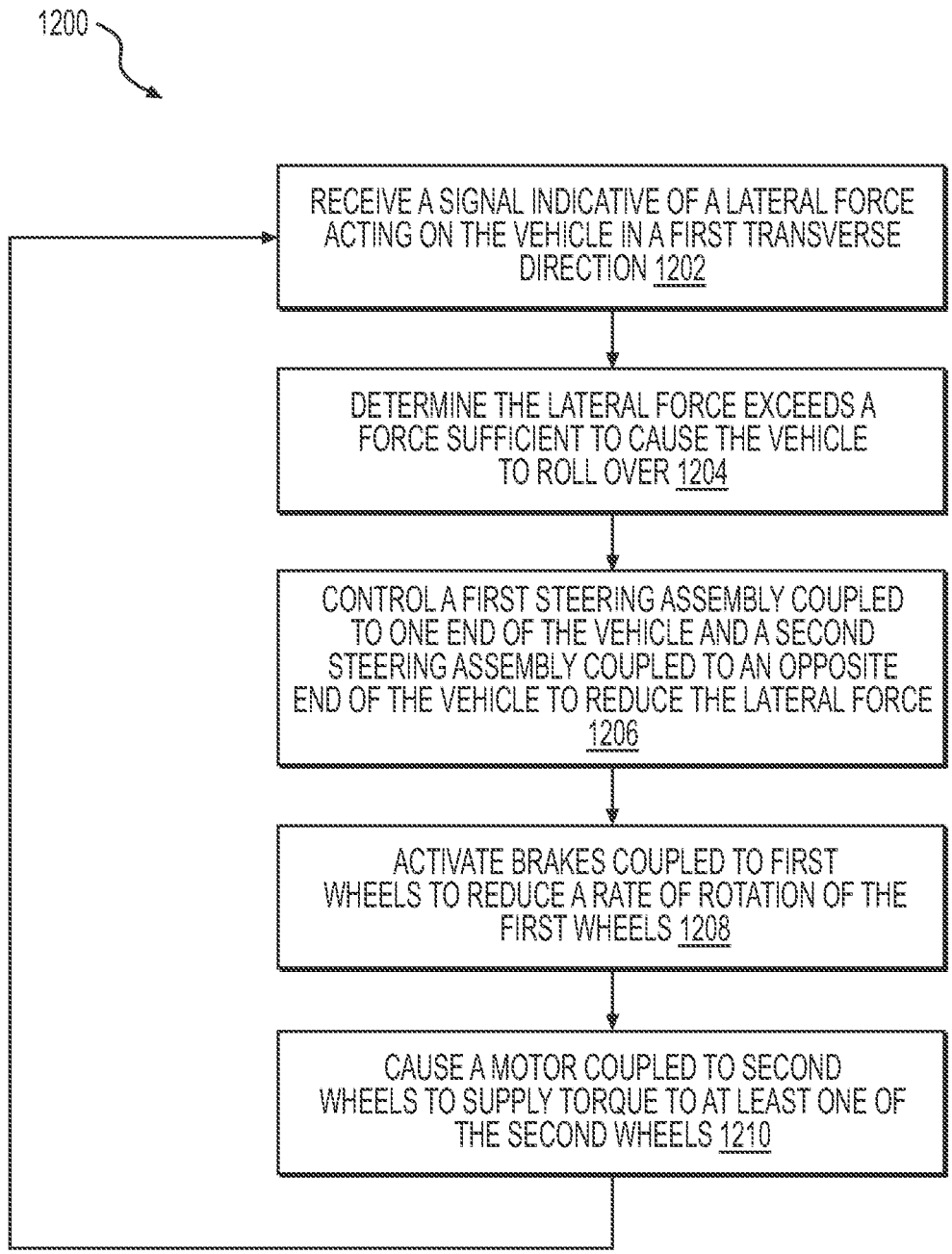
FIG. 12 is a flow diagram of an example process for preventing roll over of a vehicle.

FIG. 12 is a flow diagram of an example process 1200 for preventing roll over of a vehicle. At 1202, the example process 1200 may include receiving one or more signals indicative of a lateral force acting on the vehicle in a first direction transverse to the longitudinal axis of the vehicle. The lateral force may be detected and the one or more signals may be generated via one of more of the vehicle sensors. The one or more signals may be received by a wheel controller, such as, for example, a wheel controller consistent with those described herein. The lateral force may result from the lateral acceleration of the vehicle and/or contact with an object, such as, for example, a collision with another vehicle. In some examples, rollover or predicted rollover, may be detected by other methods/devices, such as, for example, detected orientation of the vehicle compared with expected orientation, accelerometers, gyroscopes, magnetometers, inertial measurement units, and/or other measurements relative to the ground.

At 1204, the example process 1200 may include determining, based at least in part on the one or more signals, when the lateral force exceeds a threshold force sufficient to cause the vehicle to roll over in the first direction transverse to the longitudinal axis of the vehicle. In some examples, at 1204, the example process 1200 may include determining, based at least in part on the one or more signals, when the lateral force exceeds a roll coefficient multiplied by a roll force sufficient to cause the vehicle to roll over in the first direction transverse to the longitudinal axis of the vehicle. In some examples, the roll coefficient may account for one or more safety factors. Other factors may be reflected in the roll coefficient. In some examples, the roll force may be predetermined, for example, based on characteristics of the vehicle (e.g., physical characteristics such as the weight and/or roll center of the vehicle, a moment of inertia, a speed of the vehicle, etc.), or the roll force maybe determined in real-time while the vehicle maneuvers.

At 1206, the example process 1200 may include controlling, when the lateral force exceeds the threshold force, one or more of the first steering assembly or the second steering assembly to reduce the lateral force to less than the threshold force to prevent the vehicle from rolling over in the first direction. In some examples, the wheel controller may send one or more signals to the first and second steering assemblies so that the steering assemblies pivot the first and second wheels at respective first and second steering angles to prevent the vehicle from rolling over. In some examples, at 1206, the example process 1200 may include controlling, when the lateral force exceeds the roll coefficient multiplied by the roll force, one or more of the first steering assembly or the second steering assembly to reduce the lateral force to less than the roll coefficient multiplied by the roll force and prevent the vehicle from rolling over in the first direction. In some examples, the wheel controller may send one or more signals to the first and second steering assemblies so that the steering assemblies pivot the first and second wheels at respective first and second steering angles to prevent the vehicle from rolling over.

For example, if the lateral force results from the lateral acceleration of the vehicle as it maneuvers through a curve, the method may include controlling the first steering assembly and the second steering assembly to reduce the lateral acceleration of the vehicle to reduce the lateral force to less than the threshold force, or in some examples, the roll coefficient multiplied by the roll force, and prevent the vehicle from rolling over. If the lateral force results from a collision force, the method may include controlling the first steering assembly and the second steering assembly to reduce the lateral force from the collision force to less than the threshold force, or in some examples, the roll coefficient multiplied by the roll force.

In some examples of the process 1200, when the vehicle is traveling in a first forward travel direction, such that the first end of the vehicle is the front end of the vehicle, it may include pivoting the first wheels at first steering angles relative to the first forward travel direction of the vehicle. For example, the first steering angles may range from about 5 degrees to about 90 degrees from the first forward travel direction toward the first direction transverse to the longitudinal axis of vehicle. The process 1200 may also include pivoting the second wheels at second steering angles relative to the first forward travel direction of the vehicle, and the second steering angles may range from about 5 degrees to about 90 degrees from the first forward travel direction toward the first direction transverse to the longitudinal axis of vehicle. In such examples, the first wheels and the second wheels may pivot to be pointed in generally the same direction, for example, as described herein.

In some examples, the process 1200 may include pivoting the first wheels at first steering angles relative to the first forward travel direction of the vehicle, such that the first steering angles range from about 5 degrees to about 90 degrees from the first forward travel direction and in a direction opposite the first direction transverse to the longitudinal axis of vehicle. Some such examples may also include pivoting the second wheels at second steering angles relative to the first forward travel direction of the vehicle, such that the second steering angles range from about 5 degrees to about 90 degrees from the first forward travel direction toward the first direction transverse to the longitudinal axis of vehicle. In such examples, the first wheels and the second wheels may pivot to be pointed in generally different directions.

In some such examples, the process 1200 may further include, at 1208, activating one or more brakes coupled to the first wheels of the vehicle to reduce a rate of rotation of at least one of the first wheels in response to receipt of one or more signals indicative that the lateral force exceeds a threshold force sufficient to cause the vehicle to roll over in the first direction. Combined with pivoting the first wheels in a direction opposite the first direction transverse to the longitudinal axis of vehicle and pivoting the second wheels toward the first direction transverse to the longitudinal axis of vehicle, this may reduce the lateral force to a level below the threshold force, for example, by biasing the vehicle to rotate about the first wheels. Some examples of the process 1200, may also include, at 1210, causing a motor coupled to the second wheels of the vehicle to supply torque to at least one of the second wheels in response to receipt of one or more signals indicative that the lateral force exceeds the threshold force. The torque may be supplied to cause the second wheels increase the speed of rotation. This may result in causing the vehicle to rotate about the first wheels. In some examples, the process 1200, at 1208, may include activating one or more brakes coupled to the first wheels of the vehicle to reduce a rate of rotation of at least one of the first wheels in response to receipt of one or more signals indicative that the lateral force exceeds a roll coefficient multiplied by a roll force sufficient to cause the vehicle to roll over in the first direction. This may reduce the lateral force to a level below the roll coefficient multiplied by the roll force, for example, by biasing the vehicle to rotate about the first wheels. Some examples of the process 1200, may also include, at 1210, causing a motor coupled to the second wheels of the vehicle to supply torque to at least one of the second wheels in response to receipt of one or more signals indicative that the lateral force exceeds the roll coefficient multiplied by the roll force. The torque may be supplied to cause the second wheels increase the speed of rotation. This may result in causing the vehicle to rotate about the first wheels.

Figure 13:
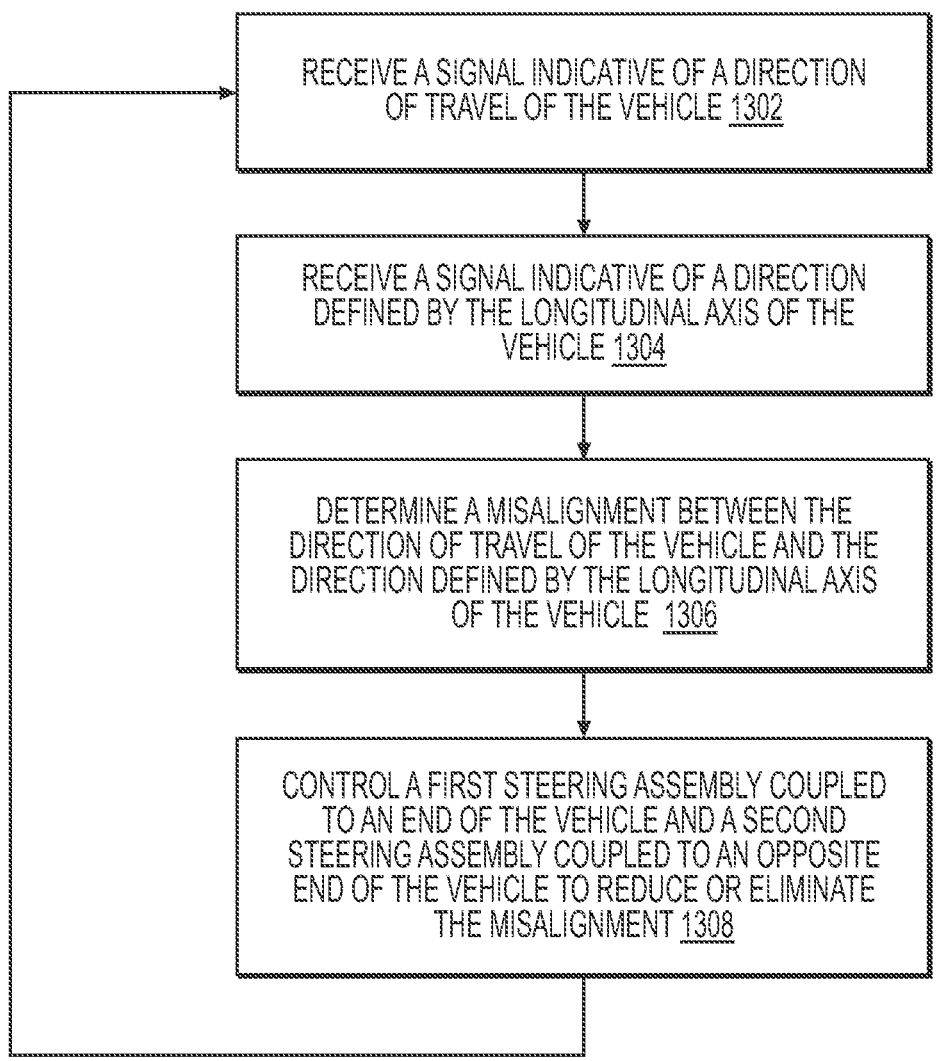
FIG. 13 is a flow diagram of an example process for reducing or eliminating misalignment between the direction of travel of a vehicle and the longitudinal axis of the vehicle.

FIG. 13 is a flow diagram of an example process 1300 for reducing or eliminating misalignment between the direction of travel of a vehicle and the direction defined by the longitudinal axis of the vehicle. At 1302, the process 1300 may include receiving one or more signals indicative of a direction of travel of a vehicle. For example, the one or more signals indicative of the direction of travel of the vehicle may include or be based at least in part on one or more signals generated and/or received from the location systems of the vehicle. For example, the location systems of the vehicle may include one or more signals generated by a global positioning system associated with the vehicle.

At 1304, the process 1300 may include receiving one or more signals indicative of a direction defined by the longitudinal axis of the vehicle, which may be aligned with or contained in a plane passing through the centerline of the vehicle. In some examples, the one or more signals indicative of the direction defined by the longitudinal axis of the vehicle may include receiving one or more signals from vehicle sensors associated with the vehicle, such as, for example, one or more sensors configured to generate one or more signals indicative of the direction defined by the longitudinal axis of the vehicle.

At 1306, the example process 1300 may include determining, based at least in part on the one or more signals indicative of the direction of travel of the vehicle and the one or more signals indicative of the direction defined by the longitudinal axis of the vehicle, a misalignment between the direction of travel of the vehicle and the direction defined by the longitudinal axis of the vehicle. This determination may be made by, for example, a wheel controller.

The example process 1300 may also include, at 1308, controlling a first steering assembly coupled proximate to a first end of the vehicle and a second steering assembly coupled proximate to a second end of the vehicle opposite the first end to reduce or eliminate the misalignment between the direction of travel of the vehicle and the direction defined by the longitudinal axis of the vehicle, for example, as discussed herein. For example, the first and second steering assemblies may cause the first wheels and the second wheels, respectively, to pivot to new steering angles that result in reducing or eliminating the misalignment.

Figure 14:
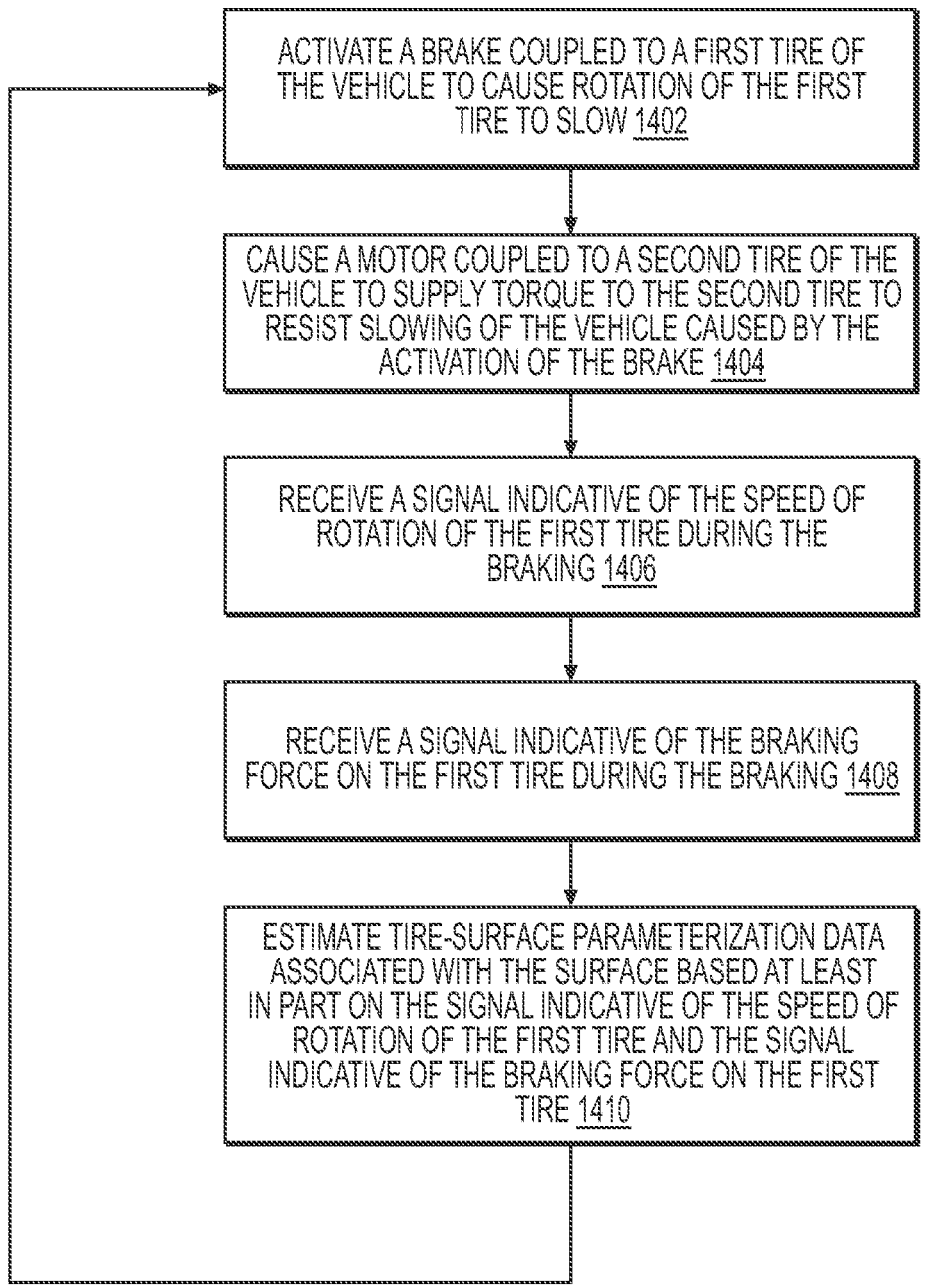
FIG. 14 is a flow diagram of an example process for estimating tire-surface parameterization data associated with the surface on which the vehicle is traveling.

FIG. 14 is a flow diagram of an example process 1400 for estimating tire-surface parameterization data associated with a surface on which a vehicle travels. At 1402, the process 1400 may include activating a brake coupled to a first tire coupled to the vehicle to cause rotation of the first tire to slow. In some examples, a brake controller may send one or more signals to a brake causing the brake to be activated, thereby slowing the first tire.

At 1404, the process 1400 may include causing a motor coupled to a second tire to supply torque to the second tire to resist slowing of the vehicle caused by activation of the brake. In some examples, a wheel controller may send one or more signals to the motor to cause the motor to supply torque to the second wheel to counteract the braking force and to prevent the vehicle from noticeably slowing when the brake is activated.

At 1406, the process 1400 may include receiving one or more signals indicative of the speed of rotation of the first tire during the braking. For example, the vehicle may include one or more vehicle sensors, such as, for example, one or more wheel encoders configured to detect the speed of rotation of the first tire. In some examples, the one or more signals may be received by a tire-surface parameterization estimator, for example, as described herein.

At 1408, the process 1400 may include receiving one or more signals indicative of a braking force on the first tire during the braking. The vehicle sensors may include, for example, a torque sensor coupled to the first wheel on which the first tire is mounted, and the torque sensor may generate one or more signals indicative of the braking force. In some examples, the one or more signals indicative of a braking force may be received by the tire-surface parameterization estimator, for example, as described herein.

The process 1400, at 1410, may include estimating the tire-surface parameterization data associated with the surface based at least in part on the one or more signals indicative of the speed of rotation of the first tire and the one or more signals indicative of the braking force on the first tire. For example, the tire-surface parameterization estimator may receive the signals and estimate the tire-surface parameterization data based at least in part on the signals. In some examples, the tire-surface parameterization data may include the friction coefficient between the surface and one or more of the tires of the vehicle. The friction coefficient may be the static friction coefficient or the dynamic friction coefficient.

In some examples, the tire-surface parameterization data may be used by the vehicle (e.g., by the vehicle systems 102) to determine performance parameters for the vehicle, such as, for example, maximum accelerations for increasing vehicle speed, maximum accelerations for reducing vehicle speed, maximum cornering speeds, etc. In some examples, the process may also include communicating data correlating the location of the vehicle and the tire-surface parameterization data via a communication network. In this example manner, the tire-surface parameterization data estimated by the vehicle may be used by other vehicles that are in communication with the communication network.

Figure 15:
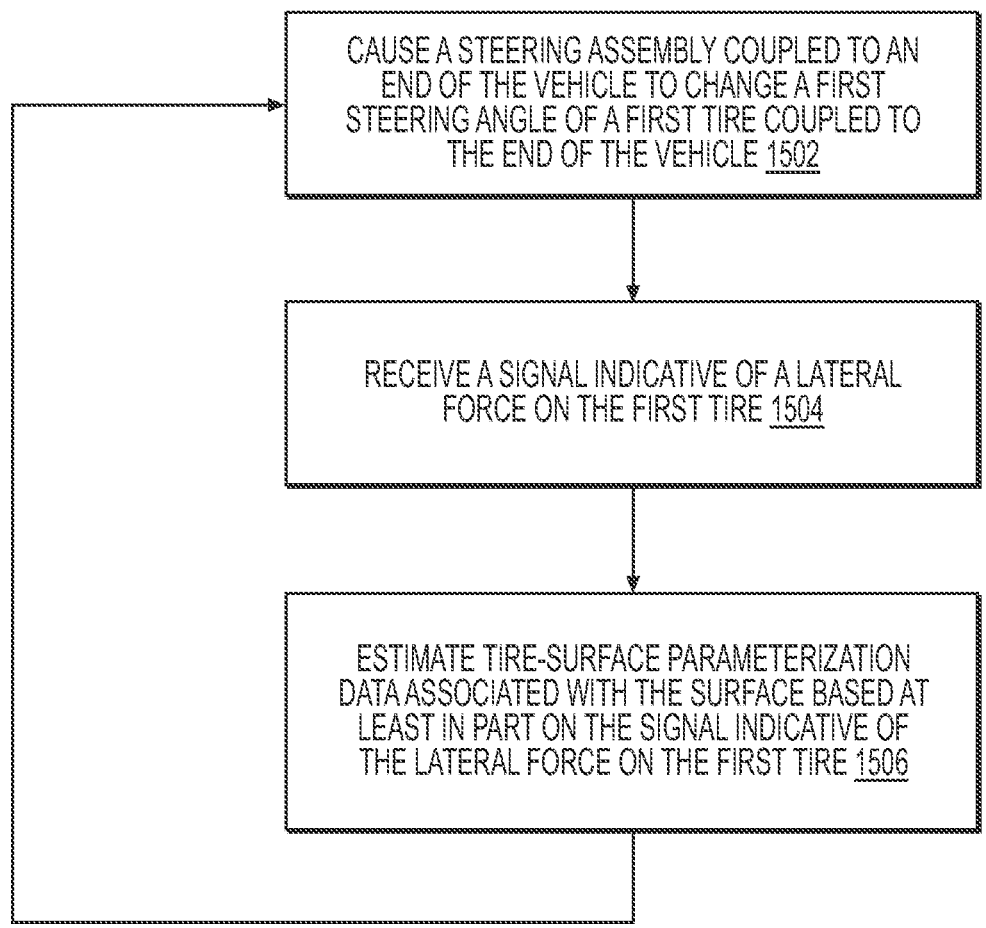
FIG. 15 is a flow diagram of another example process for estimating tire-surface parameterization data associated with the surface on which the vehicle is traveling.

FIG. 15 is a flow diagram of another example process 1500 for estimating tire-surface parameterization data associated with the surface on which the vehicle travels. At 1502, the process may include causing a steering assembly coupled proximate to an end of the vehicle to change a first steering angle of a first tire coupled proximate to the end of the vehicle, so that the first steering angle and a second steering angle of a second tire coupled proximate to the vehicle differ from one another. For example, the steering angle of the first tire may be pivoted out of the direction of travel of the vehicle to cause the first tire to scrub along the surface, thereby generating a lateral force at the first tire as the vehicle continues to travel in the direction it was traveling prior to causing the first tire to pivot.

At 1504, the process 1500 may include receiving one or more signals indicative of a lateral force on the first tire. In some examples, the tire-surface parameterization estimator may receive the one or more signals from a sensor coupled to the steering assembly and/or a suspension assembly associated with the first tire and configured to generate the one or more signals.

The process 1500, at 1506, may include estimating the tire-surface parameterization data associated with the surface based at least in part on the one or more signals indicative of the lateral force acting on the first tire. For example, the tire-surface parameterization estimator may estimate the tire-surface parameterization data based on one or more of the weight of the vehicle, the vertical load on the first tire, or the one or more signals indicative of the force acting on the steering assembly and/or the suspension assembly. In some examples, the tire-surface parameterization data may be associated with a local map and/or a global map, for example, identifying locations corresponding to the tire-surface parameterization data.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for operating an electrical system have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. A wheel control system configured to facilitate control of a vehicle, the wheel control system comprising:
    a first steering assembly configured to independently control one or more of a steering angle, a caster angle, a camber angle, tire pressure, or a toe angle of a first wheel or a second wheel at a first end relative to remaining wheels of the vehicle;
    a second steering assembly configured to be coupled proximate to a second end of the vehicle and control one or more of a steering angle, a caster angle, a camber angle, a toe angle, or a speed of a third wheel or a fourth wheel coupled proximate to the second end of the vehicle;
    a wheel controller configured to:
        determine tire-surface parameterization data, the tire-surface parameterization data determined based on a force imposed on the first wheel by an adjustment to one or more of the steering angle, caster angle, camber angle, tire pressure, or toe angle of the first wheel relative to the remaining wheels,
        cause the first steering assembly to pivot at least one of the first wheel or the second wheel at a first steering angle relative to a longitudinal axis of the vehicle,
        cause the second steering assembly to pivot at least one of the third wheel or the fourth wheel at a second steering angle relative to the longitudinal axis of the vehicle, and
        control the vehicle based at least in part on the tire-surface parameterization data; and
    an acceleration system comprising:
        a motor coupled to at least one of the first wheel, the second wheel, the third wheel, or the fourth wheel; and
        a motor controller configured to cause the motor to supply torque to one or more of at least one of the first wheel, the second wheel, the third wheel, or the fourth wheel based at least in part on the tire-surface parameterization data.

2. The wheel control system of claim 1, wherein the first wheel and the second wheel are coupled proximate to a first end of the vehicle, and wherein control of the vehicle based at least in part on the tire-surface parameterization data comprises:
    applying an adjustment to one or more of a steering angle, a caster angle, a camber angle, a toe angle, or a speed of one or more of a third wheel or a fourth wheel, the third wheel and the fourth wheel being coupled proximate to a second end of the vehicle.

3. The wheel control system of claim 1, wherein the first wheel and the second wheel are coaxially aligned.

4. The wheel control system of claim 1, wherein the first steering assembly is configured to independently control the first wheel relative to the second wheel.

5. The wheel control system of claim 1,
    wherein the first steering angle and the second steering angle have a same sign.

6. The wheel control system of claim 1,
    wherein the first steering angle and the second steering angle have opposite signs.

7. The wheel control system of claim 6, further comprising: a braking system comprising:
    brakes configured to be coupled to one or more of the first wheel, the second wheel, the third wheel, or the fourth wheel; and
    a braking controller configured to control operation of the brakes,
    wherein the braking controller is configured to slow rotation of one or more of at least one of the first wheel, the second wheel, the third wheel, or the fourth wheel based at least in part on the tire-surface parameterization data.

8. The wheel control system of claim 1, wherein control of the vehicle based at least in part on the tire-surface parameterization data comprises modifying a performance parameter for the vehicle, a suspension compliance of the vehicle, or both.

* * * * *